(12) United States Patent
Perrault, Jr. et al.

(10) Patent No.: US 10,960,396 B2
(45) Date of Patent: Mar. 30, 2021

(54) THERMAL ACTIVATED MICROFLUIDIC SWITCHING

(71) Applicant: CYTONOME/ST, LLC, Boston, MA (US)

(72) Inventors: Donald Francis Perrault, Jr., Brighton, MA (US); Johnathan Charles Sharpe, Hamilton (NZ); Erin Koksal, Cambridge, MA (US)

(73) Assignee: CYTONOME/ST, LLC, Bedford, MA (US)

( * ) Notice: Subject to any disclaimer, the term of this patent is extended or adjusted under 35 U.S.C. 154(b) by 0 days.

(21) Appl. No.: 14/715,052

(22) Filed: May 18, 2015

(65) Prior Publication Data
US 2015/0328637 A1   Nov. 19, 2015

Related U.S. Application Data

(60) Provisional application No. 61/994,764, filed on May 16, 2014.

(51) Int. Cl.
*B01L 3/00* (2006.01)
*G01N 35/00* (2006.01)
(Continued)

(52) U.S. Cl.
CPC ... *B01L 3/502738* (2013.01); *B01L 3/502761* (2013.01); *G01N 21/00* (2013.01); *G01N 35/00* (2013.01); *B01L 3/5027* (2013.01); *B01L 2200/0652* (2013.01); *B01L 2300/0816* (2013.01); *B01L 2300/0864* (2013.01); *B01L 2400/0442* (2013.01); *B01L 2400/0487* (2013.01); *B01L 2400/0622* (2013.01); *G01N 2015/1081* (2013.01)

(58) Field of Classification Search
USPC .............................. 422/73, 502–504; 436/10
See application file for complete search history.

(56) References Cited

U.S. PATENT DOCUMENTS 3,984,307 A   10/1976 Kamentsky et al.
4,175,662 A   11/1979 Zold
(Continued)

OTHER PUBLICATIONS

Quantum 9520 Series Pulse Generator Operating Manual Version 5.6 (https://www.quantumcomposers.com/pulse-delay-generator-9520) (Year: 2014).*
(Continued)

*Primary Examiner* — Dean Kwak
(74) *Attorney, Agent, or Firm* — McCarter & English, LLP; David R. Burns

(57) ABSTRACT

A microfluidic chip assembly having a plurality of microfluidic flow channels is provided. Each channel has a switching region. The microfluidic chip may further include at least one bubble jet actuator configured to generate a pressure pulse in the switching regions of the channels to selectively deflect particles in the flow. The bubble jet actuator may be configured as a blind chamber, as an operative non-through flow chamber and/or as a self-replenishment chamber. The bubble jet actuator may include a trapped air bubble. The bubble jet actuator may include a plurality of heating elements individually controlled for pre-nucleation warmup and/or for triggering vapor bubble nucleation.

12 Claims, 15 Drawing Sheets

(51) Int. Cl.
  *G01N 21/00* (2006.01)
  *G01N 15/10* (2006.01)

(56) References Cited

U.S. PATENT DOCUMENTS

| | | | |
|---|---|---|---|
| 4,723,129 A | 2/1988 | Endo et al. | |
| 4,756,427 A | 7/1988 | Gohde et al. | |
| 5,837,200 A | 11/1998 | Diessel et al. | |
| 6,296,350 B1 | 10/2001 | Cornell et al. | |
| 6,808,075 B2 * | 10/2004 | Bohm | B07C 5/34 209/172.5 |
| 7,491,911 B2 | 2/2009 | North et al. | |
| 7,492,522 B2 | 2/2009 | Gilbert et al. | |
| 7,569,788 B2 | 8/2009 | Deshpande et al. | |
| 8,123,044 B2 | 2/2012 | Johnson et al. | |
| 8,277,764 B2 | 10/2012 | Gilbert et al. | |
| 8,459,295 B2 * | 6/2013 | Kim | B41J 2/04563 137/341 |
| 8,529,161 B2 | 9/2013 | Gilbert et al. | |
| 8,553,229 B2 | 10/2013 | Furuki et al. | |
| 8,705,031 B2 | 4/2014 | Sedoglavich et al. | |
| 8,731,860 B2 | 5/2014 | Charles et al. | |
| 9,176,504 B2 | 11/2015 | Chiou et al. | |
| 9,335,247 B2 | 5/2016 | Shame et al. | |
| 9,364,831 B2 | 6/2016 | Chiou et al. | |
| 2004/0258569 A1 * | 12/2004 | Yamazaki | B01F 13/0059 422/514 |
| 2005/0284526 A1 * | 12/2005 | Welle | B01L 3/502738 137/828 |
| 2010/0190265 A1 * | 7/2010 | Dufva | B01L 3/5027 436/501 |
| 2012/0277902 A1 | 11/2012 | Sharpe et al. | |
| 2012/0307244 A1 | 12/2012 | Sharpe et al. | |
| 2013/0334407 A1 | 12/2013 | Perrault, Jr. et al. | |
| 2014/0027005 A1 | 1/2014 | Li et al. | |
| 2014/0085898 A1 | 3/2014 | Perrault, Jr. | |
| 2014/0309782 A1 | 10/2014 | Sharpe et al. | |
| 2014/0318645 A1 | 10/2014 | Koksal et al. | |

OTHER PUBLICATIONS

Quantum 9520 Downloads Page via Wayback Machine (https://web.archive.org/web/20140908045050/http://quantumcomposers.com/support/support-down/category/9520) (Year: 2014).*

Quantum 9520 Digital Delay Pulse Generator Page via Wayback Machine (https://web.archive.org/web/20140316201924/http://quantumcomposers.com:80/products/pulse-generators/item/9520-series) (Year: 2014).*

Hoefemann, H. et al., "Sorting and lysis of single cells by BubbleJet technology," Sensors and Actuators B 168: 442-445 (2012).

Maxwell, R.B. et al., "A Microbubble-Powered Bioparticle Actuator," J Microelectromechanical Sys, vol. 12, No. 5: 630-640 (Oct. 2013).

Wangler, N. et al., "Bubble Jet agent release cartridge for chemical single cell stimulation," Biomed Microdevices 15:1-8 (2013).

Wu, T-H. et al., "Pulsed Laser Triggered High Speed Microfluidic Fluorescence Activated Cell Sorter," Lab Chip Apr. 7, 2012, 12(7): 1378-1383.

Braff, R.A. et al., "A Microbubble-Powered Bioparticle Actuator," Solid-State Sensor, Actuator and Microsystems Workshop Hilton Head Island, South Carolina, pp. 138-141 Jun. 2-6, 2002.

Asai, A. et al., "One-Dimensional Model of Bubble Growth and Liquid Flow in Bubble Jet Printers," Japanese Journal of Applied Physics, vol. 26, No. 10: 1794-1801, Oct. 1987.

Asai, A., "Application of Nucleation Theory to the Design of Bubble Jet Printers," Japanese Journal of Applied Physics, vol. 28, No. 5: 909-915, May 1989.

Chen, P.H., et al., "Bubble Growth and Ink Ejection Process of a Thermal Ink Jet Printhead," International Journal of Mechanical Science, vol. 39, No. 6: 683-695, (1997).

Hoefemann, H. et al., "Bubble-Jet Actuated Cell Sorting," 15th International Conference on Miniaturized Systems for Chemistry and Life Sciences, Seattle, Washington, pp. 2040-2042, Oct. 2-6, 2011.

Hong, Y. et al., "Experimental Study of Bubble Dynamics on a Micro Heater Induced by Pulse Heating," Journal of Heat Transfer, vol. 126: 259-271, Apr. 2004.

Hong, Y. et al., "Numerical Simulation of Growth and Collapse of a Bubble Induced by a Pulsed Microheater," Journal of Microelectromechanical Systems, vol. 13, No. 5: 857-869, Oct. 2004.

Lindemann, T. et al., "Three-Dimensional CFD-Simulation of a Thermal Bubble Jet Printhead," Nano Science and Technology Institute, Nanotech, vol. 2: 227-230, (2004).

* cited by examiner

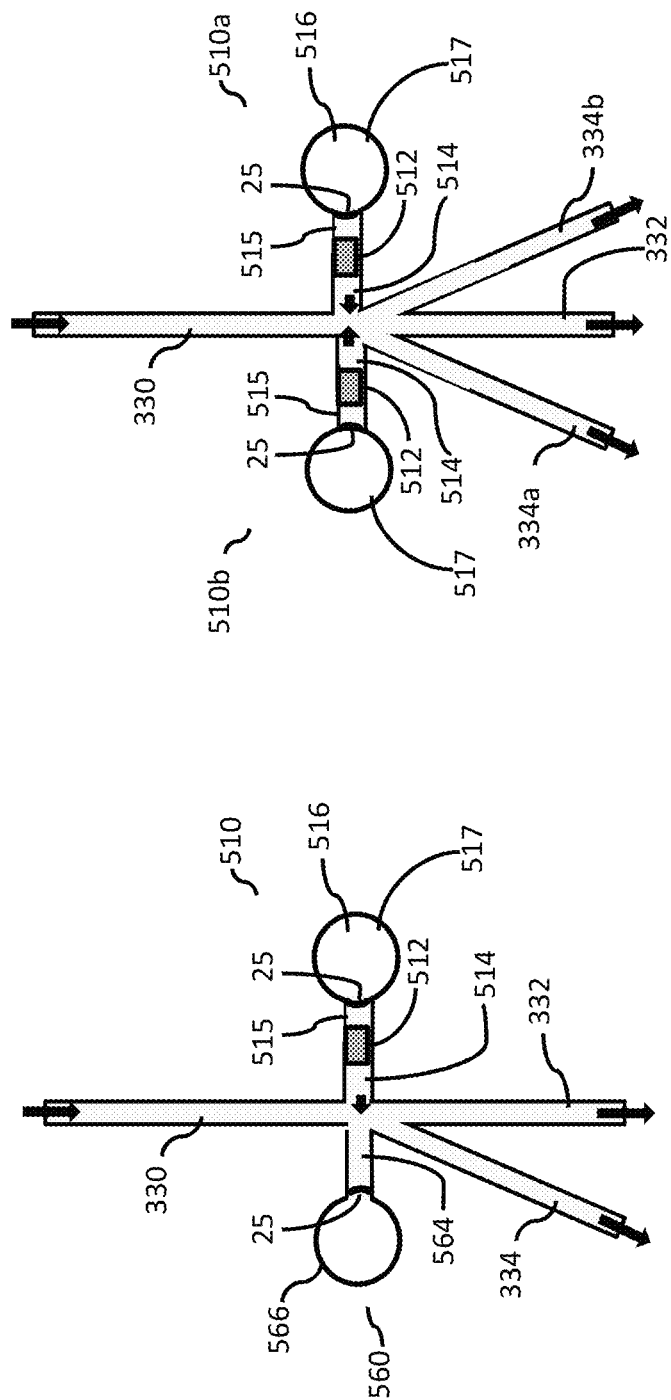

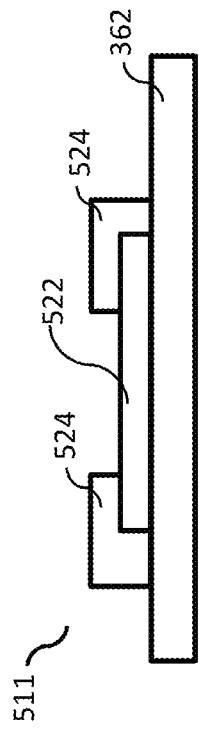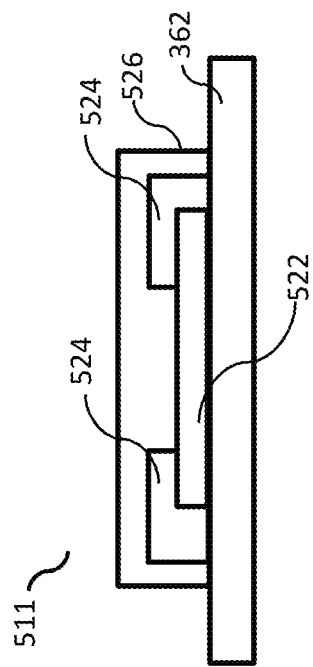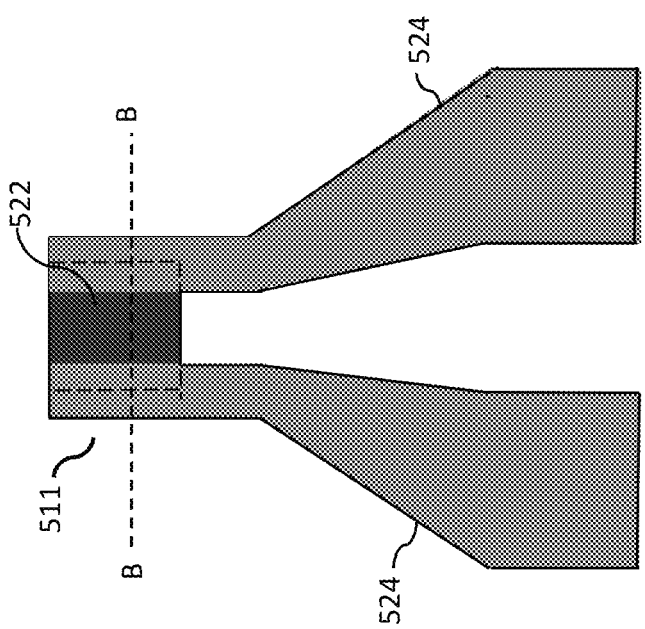

THERMAL ACTIVATED MICROFLUIDIC SWITCHING

RELATED APPLICATIONS

This application claims benefit of and priority to U.S. provisional application Ser. No. 61/994,764, filed May 16, 2014, which is incorporated herein by reference in its entirety.

TECHNICAL FIELD

The present disclosure generally relates to fluid flow instruments, e.g., particle processing apparatuses, and more particularly relates to methods and systems for controlling, operating and optimizing switch technologies for particle sorting associated with fluid flow instruments.

BACKGROUND

In the fields of biotechnology, and especially cytology and drug screening, there is a need for high throughput sorting of particles. Examples of particles that require sorting are various types of cells, such as blood platelets, white blood cells, tumorous cells, embryonic cells and the like.

Methods and apparatuses for particle sorting which operate according the detect-decide-deflect principle are known. Particles into introduced into a channel which branches into two or more channels at a sorting point downstream. The particles are surrounded by a sheath fluid, which confines the particles to the center of the channel. In a detection region of the channel a characteristic (such as optical absorption, fluorescent intensity, size etc) of the particles is determined using a detector. When the detector detects a particle having a predetermined characteristic a signal generator is activated for sorting or deflecting the particle. Pneumatic, hydrodynamic, electrical, magnetic, optical, acoustic and mechanical means have all been used to deflect the stream and/or the particle into a keep channel.

One subset of prior art sorters rely on pressure pulses to deflect the particles. One disadvantage of the prior art is that the generated pressure waves may not be confined to the switching region, but may propagate upstream into the detector region as well as downstream both branches and influence the overall flow through the channel. This may be particularly a drawback for very high throughput, high speed sorters. Further, this may be a particular drawback if sorters of this type are connected either in series or in parallel as to build a sorter system with increased throughput. Pressure waves generated in one sorter may undesirably influence the flows and deflection of particles in neighboring sorter units.

Inkjet printers incorporating micro-mechanical systems (MEMS) vapor bubble generators that use a resistive heater in thermal contact with a liquid to generate a bubble are known. These inkjet printers have a steady supply of replenishment ink flow across the resistive heater. See, e.g., U.S. Pat. No. 7,491,911, "MEMS bubble generator for large stable vapor bubbles," (Ser. No. 11/544,778), the contents of which is incorporated by reference herein in its entirety.

It is desirable to robustly increase the throughput of sorting apparatuses, i.e. how many particles can be sorted per unit of time. It is also desirable to reduce the size and the cost of the particle sorters, while improving their accuracy and efficiency. Thus, improving the operation and control of the switch mechanism, while reducing is size and integrating it into the particle sorter is desired. Further, it is desired to improve the overall simplicity of the sorting apparatus and in particular, the engagement of the microfluidic chip with the instrument. If the engagement of the microfluidic chip to the sorting instrument is complex, costs are increased and system robustness is decreased.

SUMMARY

The present disclosure provides a method and apparatus for sorting particles moving through a closed microfluidic channel system. The particle sorting system of the disclosure provides a sorting module that can be assembled at low cost while providing an accurate means of sorting large amounts of particles per unit of time. The particle sorting system may include a plurality of microfluidic flow channels, which may be combined to further increase the sorting rate.

In one aspect, the disclosure includes a method of sorting particles including the steps of providing a primary microfluidic channel having an inlet and a branching point at which the channel separates into two branch channels, conducting a stream of fluid into the channel inlet with a stream of particles suspended therein, such that the particles normally flow through a first one of the branch channels, and providing upstream from the branching point a bubble jet actuator in fluid communication with the microfluidic channel for deflecting a particle from the stream in the channel. The bubble jet actuator includes a side passage hydraulically connected to a vapor bubble generator. A second side passage may hydraulically connect a pressure pulse dampening chamber with the microfluidic channel for absorbing pressure variations.

The method further includes providing an interrogation region along the primary microfluidic channel upstream of the side passages for sensing a predetermined characteristic of particles in the stream and for producing a signal when the predetermined characteristic is sensed. The method further includes the step of, in response to sensing the predetermined characteristic, activating an external signal generator for creating a transverse pressure pulse in the microfluidic channel, thereby deflecting the particle having the predetermined characteristics and causing the selected particle to flow down the second branch channel.

According to another aspect, a microfluidic particle processing chip assembly includes a substrate and a plurality of flow channels formed in the substrate. Each flow channel has a focusing region for focusing a flow of particles within the flow channel, an interrogation region at least partially downstream of the focusing region, and a switching region at least partially downstream of the interrogation region. The microfluidic particle processing chip assembly further includes a bubble jet actuator formed on the substrate and configured to generate a pressure pulse in the flow in the switching region of the flow channel. The bubble jet actuator is one of a blind, closed-end chamber, an operative non-through flow chamber, and a self-replenishment chamber.

In some aspects, the bubble jet actuator includes a plurality of heating elements formed on the substrate, each heating element individually controlled by a signal generator. Each heating element may be individually controlled for pre-nucleation warmup. Each heating element may be individually controlled for triggering vapor bubble nucleation.

According to other aspects, more than one bubble jet actuator may be provided, each bubble jet actuator configured to generate pressure pulses in the flow in the switching region of the flow channel. A second bubble jet actuator may be configured to generate a second pressure pulse in the flow in the switching region of the flow channel. The second bubble jet actuator may be opposed to the first bubble jet actuator.

According to certain aspects, the bubble jet actuator includes a trapped air bubble. The bubble jet actuator includes at least one heating element and wherein the bubble jet actuator may include a constricted region between a heating element and the trapped air bubble.

According to another aspect, a microfluidic particle processing chip assembly includes a pressure pulse dampening element, wherein the pressure pulse dampening element is opposed to the bubble jet actuator.

BRIEF DESCRIPTION OF THE DRAWINGS

A more complete understanding of the present disclosure and certain advantages thereof may be acquired by referring to the following description in consideration with the accompanying drawings, in which like reference numbers indicate like features.

FIG. 8 is a schematic view of an embodiment of the switch mechanism.

FIG. 9 is a schematic view of an embodiment of the switch mechanism with two bubble jet actuators.

FIG. 20A is a schematic top view of an embodiment of a vapor bubble generator; FIG. 20B is a cross-sectional view through line B-B of the embodiment of FIG. 20A; FIG. 20C is a cross-sectional view through line B-B of the embodiment of FIG. 20A with an electrically insulating layer.

Figure 1:
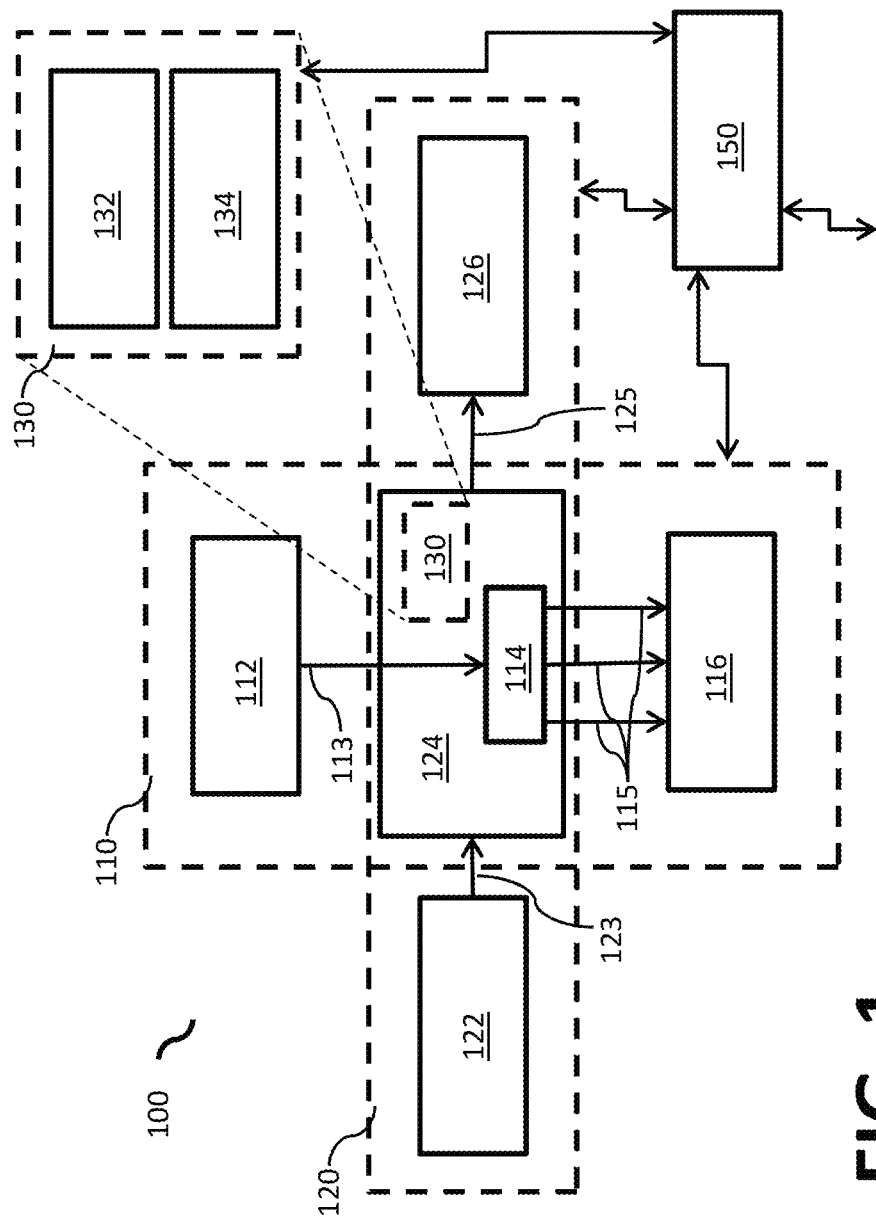
FIG. 1 schematically illustrates an exemplary particle processing system according to aspects of the present disclosure.

It is to be noted that the various features and combinations of features described below and illustrated in the figures can be arranged and/organized differently to result in embodiments which are still within the spirit and scope of the present disclosure. Further, components in the drawings are not necessarily to scale nor are they necessarily rendered proportionally, emphasis instead being placed upon clearly illustrating the relevant principles. Even further, various features may not be show in certain figures in order to simplify the illustrations. Additionally, for the purposes of describing or showing items between layers or behind other elements or for generally simplifying the views in certain of these figures, various components or elements may be illustrated as transparent and/or cross-hatching or other standard drawing techniques may be not be presented. To assist those of ordinary skill in the art in making and using the disclosed systems, assemblies and methods, reference is made to the appended figures.

While the present disclosure may be embodied with various modifications and alternative forms, specific embodiments are illustrated in the figures and described herein by way of illustrative examples. It should be understood the figures and detailed descriptions are not intended to limit the scope of the claims to the particular form disclosed, but that all modifications, alternatives, and equivalents falling within the spirit and scope of the claims are intended to be covered.

DETAILED DESCRIPTION

In the following description of various example embodiments, reference is made to the accompanying drawings, which form a part hereof, and in which are shown by way of illustration various example devices, systems, and environments in which aspects of the fluid handling system may be practiced. It is to be understood that other specific arrangements of parts, example devices, systems, and environments may be utilized and structural and functional modifications may be made without departing from the scope of the present disclosure.

The particle sorting system implements an improved fluidic particle switching method and switching device for a microfluidic channel system according to the current disclosure. A switch mechanism is positioned in communication with the primary microfluidic channel through which particles flow. The switch mechanism may include one or more bubble jet actuators in fluid communication with the primary microfluidic channel. Each bubble jet actuator is provided with at least one heating element or vapor bubble generator. Fluid from the primary microfluidic channel is allowed to at least partly fill the bubble jet actuators to cover the heating elements. When the bubble jet actuator is activated, heat is generated by the heating element and conducted into the fluid covering the heating element. Due to a heat flux, the fluid adjacent the heating element is superheated and a vapor bubble is generated. The generation and rapid expansion of the vapor bubble results in a pressure pulse in the bubble jet actuator such that fluid within the bubble jet actuator is directed into the primary microfluidic channel. The pressure pulse causes a flow disturbance within the primary microfluidic channel, which serves to deflect a particle from the stream of particles. The bubble jet actuators may communicate with the primary microfluidic channel through fluid-filled side passages.

The time scale for heating a liquid to its superheat limit determines how much thermal energy will be stored in the fluid when the superheat limit is reached. This in turn determines how much vapor will be produced and the impulse (i.e., pressure integrated over area and time) produced by the expanding vapor larger amount of stored energy, a larger amount of vapor and larger bubble impulse. This leads to some degree of tunability for the bubbles produced by heater elements, because controlling the power supplied to the heating element controls the thermal energy transferred to the fluid. For resistive heating elements, the power may be controlled by reduced voltage across the heating element or by pulse width modulation of the voltage to obtain a lower time averaged power. For example, a predetermined number of pulses of a constant set duration may be used to trigger or actuate vapor bubble generation. See, "Sorting and Lysis of Single Cells by BubbleJet Technology," Hoefemann, H. et al., Sensors and Actuators B 168(2012) 442-445, which is incorporated by reference herein in its entirety. Further, by controlling the thermal energy supplied to the fluid during a warm-up or pre-nucleating portion of bubble formation, the speed of the nucleation of the vapor bubble across the surface of the heater during the nucleating portion may be increased and larger bubbles formed. Thus, as another example, a signal generator may provide a pre-heat series of a predetermined number of pulses separated by a predetermined delay period, followed by a nucleation trigger pulse. See, U.S. Pat. No. 7,491,911, "MEMS Bubble Generator for Large Stable Vapor Bubble" to North, (Ser. No. 11/544,778); and see also, U.S. Pat. No. 6,296,350, "Ink Jet Printer Having Driver Circuit for Generating Warming and Firing Pulses for Heating Elements," (Ser. No. 08/823,594), each of which is incorporated by reference herein in its entirety. For vapor bubbles produced by irradiation, for example by a pulse laser, the power supplied to the fluid may be controlled by the energy, pulse frequency, and/or wavelength of the pulse laser, which in turn may be modulated by a controller.

A switching mechanism based on vapor bubble generation may provide a rapid conversion of the energy supplied to the heating element into the propulsive power, a relatively large magnitude of propulsive forces, a relatively large displacement produced by the vapor bubble, and an extremely transient switching event. For example, upon initiation, a vapor bubble may start to rapidly expand within the first hundred nanoseconds, provide a maximum propulsive force within 10 to 20 microseconds, followed by a rapid collapse of the bubble, with the switching event possibly being completed within a hundred microseconds.

The present disclosure provides a particle sorting system for sorting particles suspended in a liquid. The particle sorting system provides high-throughput, low error sorting of particles based on a predetermined characteristic. The present disclosure will be described below relative to illustrative embodiments. Those skilled in the art will appreciate that the present disclosure may be implemented in a number of different applications and embodiments and is not specifically limited in its application to the particular embodiments depicted herein.

A microfluidic particle analysis and/or sorting system incorporating a microfluidic chip or other flow cell, in accordance some embodiments, may have a wide variety of applications as a therapeutic medical device enabling cell-based therapies, such as blood transfusion, bone marrow transplants, and/or mobilized peripheral blood implants. Embodiments of microfluidic systems may be capable of analyzing, processing and/or selecting particles based on intrinsic characteristics as determined, for example, by interaction of electromagnetic radiation or light with the cells (e.g., scatter, reflection, and/or auto fluorescence) independent of protocols and necessary reagents. According to some preferred embodiments, a microfluidic system may employ a closed, sterile, disposable cartridge including a microfluidic chip or other flow cell, such that all surfaces that come into contact with the sample fluid are isolated from the user and/or from the non-disposable instrument. Ideally, a microfluidic system analyzes and/or processes particles at high speeds. Ideally, a microfluidic sorting system also delivers sorted particles with high yield, high purity, and high efficacy.

Certain embodiments described herein relate to the particle processing systems for the analysis and sorting of particles. A particle processing system may be configured, dimensioned and adapted for analyzing, sorting, and/or processing (e.g., purifying, measuring, isolating, detecting, monitoring and/or enriching) particles (e.g., cells, microscopic particles, etc.) or the like. For example, a particle processing system may include a flow cytometer, a droplet sorter, a microfluidic chip, a liquid chromatograph, a cell purification system, other flow-through analytical instruments or the like, although the present disclosure is not limited thereto.

Certain embodiments described herein relate to systems and methods for manipulating particles in a flow channel and, in particular, in a micro channel in microfluidic devices.

As used herein, the term "particles" includes, but is not limited to, cells (e.g., blood platelets, white blood cells, tumorous cells, embryonic cells, spermatozoa, etc.), organelles, and multi-cellular organisms. Particles may include liposomes, proteoliposomes, yeast, bacteria, viruses, pollens, algae, or the like. Additionally, particles may include genetic material, RNA, DNA, fragments, proteins, etc. Particles may also refer to non-biological particles. For example, particles may include metals, minerals, polymeric substances, glasses, ceramics, composites, or the like. Particles may also refer to synthetic beads (e.g., polystyrene), for example, beads provided with fluorochrome conjugated antibodies.

As used herein, the term "microfluidic system" refers to a system or device including at least one fluidic channel having microscale dimensions. The microfluidic system may be configured to handle, process, detect, analyze, eject, and/or sort a fluid sample and/or particles within a fluid sample. The term "channel" as used herein refers to a pathway formed in or through a medium or substrate that allows for movement of fluids, such as liquids and gases. The term "micro channel" refers to a channel, preferably formed in a microfluidic system or device, having cross-sectional dimensions in the range between about 1 µm and about 1000 µm, preferably between about 25 µm and about 500 µm, and most preferably between about 50 µm and about 300 µm. One of ordinary skill in the art will be able to determine an appropriate volume and length of the micro channel for a desired application. The ranges above are intended to include the above-recited values as upper or lower limits. In general, a micro channel may have any selected cross-sectional shape, for example, U-shaped, D-shaped, rectangular, triangular, elliptical/oval, circular, square, trapezoidal, etc. cross-sectional geometries. The geometry may be constant or may vary along the length of the micro channel. Further, a micro channel may have any selected arrangement or configuration, including linear, non-linear, merging, branching, looped, twisting, stepped, etc. configurations. A microfluidic system or device, for example, a microfluidic chip, may include any suitable number of micro channels for transporting fluids. A microfluidic chip may be provided as part of a disposable cartridge for removable engagement with a microfluidic instrument. Further, a microfluidic chip may be provided as part of a disposable cartridge, wherein the disposable cartridge is a completely enclosed and sealed or sealable fluidic channel system.

As used herein the terms "vertical," "lateral," "top," "bottom," "above", "below," "up," "down," and other similar phrases should be understood as descriptive terms providing general relationship between depicted features in the figures and not limiting on the claims, especially relating to flow channels and microfluidic chips described herein, which may be operated in any orientation.

Referring now to the schematic of FIG. 1, a particle processing system 100 suitable for implementing an illustrative embodiment of the present disclosure is schematically shown. Particle processing system 100 may be configured, dimensioned or adapted for analyzing, sorting and/or processing (e.g., purifying, measuring, isolating, detecting, monitoring and/or enriching) particles (e.g., cells, microscopic particles, etc.). For example, system 100 may be a cytometer and/or a cell purification system or the like, although the present disclosure is not limited thereto. Rather, system 100 may take a variety of forms, and it is noted that the systems and methods described may be applied to other processing systems. Processing elements or components provided by system 100 may include transport channels, pumps, valves, mixing elements, temperature control elements, pressure control elements, droplet generators, incubation elements, wells, reagent coated surfaces or reagent storage elements, geometric physical structures (posts, guides, etc.), et al. These elements or components may reside on the microfluidic chip, the cartridge, and/or the instrument.

In exemplary embodiments, particle processing system 100 may be a microfluidic flow sorter particle processing system (e.g., a microfluidic chip based system) or the like. Aspects of exemplary microfluidic flow sorter particle processing systems and components or the like are disclosed, for example, in U.S. Pat. No. 8,529,161, "Multilayer Hydrodynamic Sheath Flow Structure" (Ser. No. 13/179,084); U.S. Pat. No. 8,277,764, "Unitary Cartridge for Particle Processing" (Ser. No. 11/295,183); U.S. Pat. No. 8,123,044, "Actuation of Parallel Microfluidic Arrays" (Ser. No. 11/800,469); U.S. Pat. No. 7,569,788, "Method and Apparatus for Sorting Particles" (Ser. No. 11/101,038); U.S. Pat. No. 7,492,522, "Optical Detector for a Particle Sorting. System" (Ser. No. 11/906,621); U.S. Pat. No. 6,808,075, "Method and Apparatus for Sorting Particles" (Ser. No. 10/179,488); U.S. Pat. No. 8,731,860, "Particle Processing Systems and Methods for Normalization/Calibration of Same" (Ser. No. 13/022, 525); U.S. Pat. No. 8,705,031, "Particle Sorting Apparatus and Method" (Ser. No. 13/363,112) and U.S. Pat. No. 8,553,229, "Fine Particle Optical Measuring Method in Fluidic Channels" to Shinoda (Ser. No. 12/259,235); and US Patent Publication No. 2012/0277902, "Method and Apparatus for Monitoring and Optimizing Microfluidic Particle Sorting" (Ser. No. 13/342,756, filed Jan. 3, 2012); US Patent Publication No. 2012/0307244, "Multiple Flow Channel Particle Analysis System" (Ser. No. 13/577,216, filed Aug. 3, 2012); US Patent Publication No. 2013/0334407, "Large Area, Low F-Number Optical System" (Ser. No. 13/896, 213, filed May 16, 2013); US Patent Publication No. 2014/ 0085898, "Focal Plane Shifting System" (Ser. No. 14/029, 485, filed Sep. 17, 2013); US Patent Publication No. 2014/ 0318645, "Hydrodynamic Focusing Apparatus and Methods" (Ser. No. 14/213,800, filed Mar. 14, 2014); US Patent Publication No. 2014/0370536, "Assemblies and Methods for Reducing Optical Crosstalk in Particle Processing Systems" (Ser. No. 14/210,366, filed Mar. 13, 2104); and US Patent Publication No. 2014/0309782, "Operatorless Particle Processing Systems and Methods" (Ser. No. 14/210, 381, filed Mar. 13, 2104), all of which are incorporated herein by reference in their entireties.

Still referring to FIG. 1, in exemplary embodiments, particle processing system 100 may include a particle interrogation system 110, a fluidic system 120, and a particle manipulation system 130. System 100 may also include a control system 150.

Particle interrogation system 110 may include an illumination system 112 and a detection system 116. Illumination system 112 of interrogation system 110 may provide one or more signals 113 for interrogating particles that pass through a detection or interrogation region 114. Detection system 116 of system 100 may receive one or more signals 115 that emanate from the interrogation region 114.

Fluidic system 120 may include a microfluidic channel assembly 124 configured to receive particles via one or more input fluid communication elements 123 from a particle source supply 122 and to send particles to a collection system 126 via one or more output fluid communication elements 125. Particle source supply 122 and/or collection system 126 may be provided as part of fluidic system 120 (as shown in FIG. 1) or may be supplied separately from and subsequently engaged to fluidic system 120. Particle interrogation region 114 may be included within microfluidic channel assembly 124. According to certain aspects, microfluidic channel assembly 124 may be provided as a microfluidic chip, which may be removably and fluidically engaged to the remainder of the fluidic system 120. According to certain aspects, the microfluidic chip may be disposable.

Figure 4:
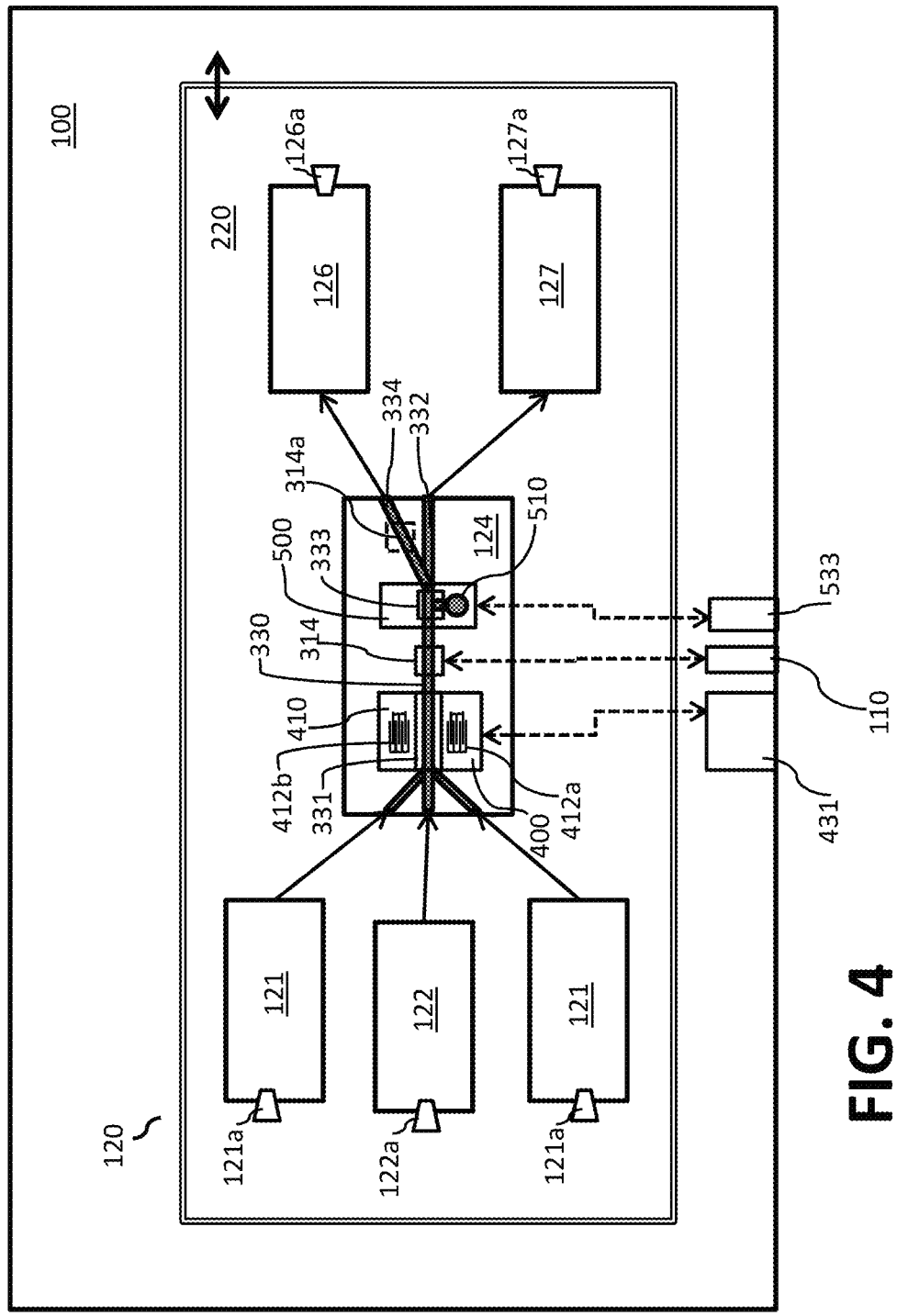
FIG. 4 schematically illustrates an exemplary fluidic system including a microfluidic chip operationally engaged to a cartridge and operationally engaged to a particle processing instrument according to aspects of the present disclosure.

Referring to FIG. 4, according to other aspects, fluidic system 120 may be provided as a cartridge 220 enclosing all of the fluid contact surfaces used in the particle processing. During a particle processing operation, the cartridge 220 may be operationally engaged to the remainder of the particle processing system 100 without violating the enclosed and/or fluidically sealed nature of the cartridge 220 and of the fluid contact surfaces. Further, cartridge 220 may be removable from the remainder of the particle processing system 100 and disposable.

Referring back to FIG. 1, particle manipulation system 130 may include a particle focusing system 132. Particle focusing system 132 may entrain (e.g., focusing, aligning, separating, stabilizing, orienting, etc.) particles upstream of the interrogation region 114 in order to optimize or enhance the particle interrogation process. Particle manipulation system 130 may also include a particle switching system 134. Particle switching system 134 may be operative downstream of the interrogation region 114, such that particles having particular characteristics may be directed, deflected, switched etc. to a selected flow path. In certain embodiments, the particles may be directed to a selected flow path on a particle-by-particle basis.

Elements or components of the particle focusing system 132 and/or the particle switching system 134 may be included within microfluidic channel assembly 124. For example, particle focusing system 132 may include a hydrodynamic focusing region that is integrally formed with a microfluidic flow channel on a microfluidic chip. Optionally, particle focusing system 132 may include an inertial focusing region that is integrally formed with a microfluidic flow channel on a microfluidic chip. As another example, particle focusing system 132 may include one or more IDTs or other surface acoustic wave (SAW) generation devices for generating SAWs within microfluidic flow channels on a microfluidic chip. The IDT driver or SAW driver may be located off chip. Similarly, particle switching system 134 may include one or more IDTs for generating SAWs within microfluidic flow channels on a microfluidic chip and the IDT driver may be located off chip.

Control system 150 may receive signals from the particle interrogation system 110, from the fluidic system 120, from the particle manipulation system 130, and/or from external sources. Control system 150 may send or transmit signals to the particle interrogation system 110, to the fluidic system 120, to the particle manipulation system 130, and/or to external sources. Control system 150 may include separate or distributed control subsystems for controlling the particle interrogation system 110, the fluid system 120, the particle manipulation system 130, the overall particle processing operations, etc. Each of these separate control subsystems may interact (i.e., receiving and/or sending signals) with any of the other control subsystems.

Figure 2:
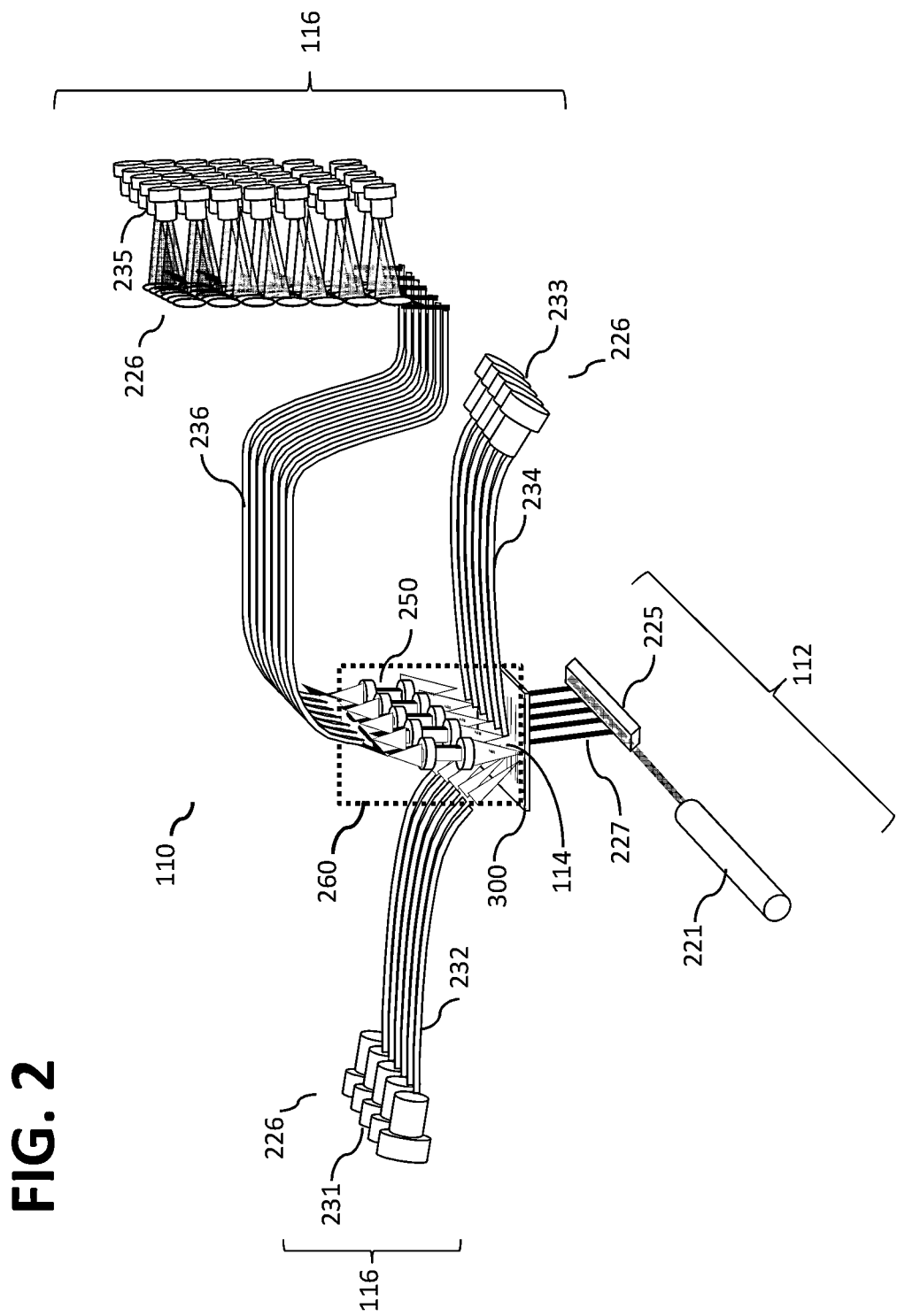
FIG. 2 schematically illustrates an exemplary particle interrogation system according to aspects of the present disclosure.

In the exemplary embodiment schematically shown in FIG. 2, a particle interrogation system 110, as may be provided as part of particle processing system 100, is illustrated as a multi-channel flow sorter particle processing system. Exemplary multi-channel flow sorter particle processing systems and components or the like are disclosed, for example, in US Patent Publication No. 2012/0307244 (Ser. No. 13/577,216; filed Aug. 3, 2012), "Multiple Flow Channel Particle Analysis System," the contents of which is hereby incorporated by reference in its entirety. Thus, according to certain aspects, microfluidic channel assembly 124 may be provided as a multi-channel microfluidic assembly 300 and particle interrogation system 110 may be configured to interrogate a plurality of particles simultaneously (or near simultaneously) flowing through a plurality of microfluidic flow channels formed within multi-channel microfluidic assembly 300. As one example, the particle interrogation system 110 may interrogate particles in the interrogation regions of the microfluidic channels sequentially (in a near simultaneous manner) by stepwise interrogation using one or more radiation sources and one or more detectors.

A receptacle or holder (not shown) may be provided for removably receiving the multi-channel microfluidic assembly 300. Further, the particle processing system 100 may include one or more stages for positioning and/or aligning the microfluidic channel assembly 124, the microfluidic assembly 300, and/or the cartridge 220 relative to the various components of particle interrogation system 110. The stages may allow for movement (translation and/or rotation) of the microfluidic channel assembly 124, the microfluidic assembly 300, and/or the cartridge 220 relative to the illumination system 112 and/or the detection system 116. Additionally, one or more stages may be provided to align the microfluidic assemblies 124, 300, 220 relative to the particle manipulation system 130, should the particle manipulation system 130 be separately provided on the microfluidic instrument.

In this specific embodiment, illumination system 112 may include at least one electromagnetic radiation or light source 221 (e.g., a laser source or the like) for illuminating at least a portion of an interrogation region 114. The electromagnetic radiation source 221 may be coupled to and/or in communication with beam shaping optics 225 (e.g., lenses, mirrors, filters, or the like) for producing and forming one or more beams of electromagnetic radiation (e.g., light) 227. Coupling elements may include fiber optics, wave guides, etc. Further, the one or more beams 227 may be used to interrogate a plurality of microfluidic flow channels simultaneously. The light source 221 may be provided as one or more monochromatic light sources and/or one or more polychromatic light sources. In general, the electromagnetic radiation source(s) 221 may have any suitable wavelength(s) appropriate for the specific application.

Detection system 116 may include a plurality of detector systems 226 configured for capturing signals associated with the sample flowing through or located within interrogation region 114. Further, detector systems 226 may monitor flow through a plurality of microfluidic flow channels simultaneously. In exemplary embodiments, detector systems 226 may be optical detector systems for inspecting individual particles for one or more particular characteristics, such as size, form, fluorescence, optical scattering, as well as other characteristics.

In some embodiments, the one or more radiation beams 227 may pass through a spatial filter, for example, an optical mask (not shown) aligned with a plurality of particle-conveying micro channels in the microfluidic assembly 300. The optical mask may take the form of an array of pinholes or slits (e.g., provided in an optically opaque layer) associated with the interrogation regions of the plurality of micro channels. Other spatial and/or spectral filter arrays may be provided in the illumination and/or detection paths of the particle interrogation system 110. For example, a masking system (using opaque regions and/or specific optical bandwidth filtered regions) may be provided to implement a multiplexing or modulating system in the emission and/or detection paths. Additionally, masking or other identification elements (e.g., barcodes) may be used to identify specific channels, chips, cartridges, or other features.

Examples of optical signals that may be produced in optical particle analysis, cytometry and/or sorting when a beam 227 intersects a particle include, without limitation, optical extinction, angle dependent optical scatter (forward and/or side scatter) and fluorescence. Optical extinction refers to the amount of electromagnetic radiation or light that a particle extinguishes, absorbs, or blocks. Angle dependent optical scatter refers to the fraction of electromagnetic radiation that is scattered or bent at each angle away from or toward the incident electromagnetic radiation beam. Fluorescent electromagnetic radiation may be electromagnetic radiation that is absorbed and/or scattered by molecules associated with a particle or cell and re-emitted at a different wavelength. In some instances, fluorescent detection may be performed using intrinsically fluorescent molecules.

In exemplary embodiments, detector systems 226 may include one or more detector assemblies to capture and observe the signals generated by the intersection of electromagnetic radiation beam 227 with a particle in a microfluidic flow channel 330. By way of non-limiting examples, detector systems 226 may include one or more extinction detector assemblies 231 for capturing extinction signals, one or more scatter detector assemblies 233 for capturing scatter signals, and one or more fluorescence detector assemblies 235 for capturing fluorescence signals. In a preferred embodiment, detector system 226 may include at least one extinction detector assembly 231, at least one scatter detector assembly 233, and at least one fluorescence detector assembly 235. Detector assemblies 231, 233, 235 may include one or more photomultipliers, photodiodes, cameras, or other suitable device(s).

According to certain aspects, interrogation system 110 may include one or more optical systems 250 for collecting, directing, transmitting, shaping, focusing, filtering, etc. the signals associated with the interrogation of the particles. Optical systems 250 may include one or more lenses, filters, mirrors, and/or other optical elements to collect, shape, focus, transmit, etc. the signal exiting the interrogation region 114 and being received by the detector assemblies 231, 233, 235. As a non-limiting example, a plurality of optical systems 250 may be provided as a micro-lens array 260. Optionally, fiber optics or other waveguide-type optical transmission elements 232, 234 may be provided to direct the signals to the detector assemblies.

According to certain embodiments, a single detector or detector assembly may be associated with a plurality of interrogation sites (e.g., specific regions within each microfluidic flow channel and/or interrogation regions across multiple microfluidic flow channels) and thus, may receive signals (simultaneously, sequentially, overlapping, non-overlapping, etc.) from each of the plurality of interrogation sites. The detector assemblies may be connected to control electronics (not shown) to analyze the signals received from the detector assemblies and/or to control one or more aspects of the particle processing system 100.

As noted, particle processing system 100 may include a multi-channel microfluidic assembly 300. In the embodiment shown in FIG. 3, a multi-channel microfluidic assembly 300 may include a plurality of microfluidic flow channels 330 for conveying a fluidic sample including, for example, particles or cells, therethrough. Multi-channel microfluidic assembly 300 includes a particle interrogation region 114 that encompasses a plurality of particle interrogation sites 314, each particle interrogation site 314 associated with one of the microfluidic flow channels 330. In this particular embodiment, microfluidic assemble 300 includes 24 microfluidic flow channels 330 arranged in parallel.

In general, assembly 300 may include any suitable number of microfluidic flow channels 330 for transporting sample fluids and particles through assembly 300. Further, arrangements other than a parallel arrangement of the microfluidic flow channels 330 may be provided. In certain embodiments and as can be understood by those familiar with the art, multi-channel microfluidic assembly 300 may be provided as a combination of microfluidic chips, micro channels, cuvettes, capillaries, etc.

Figure 3:
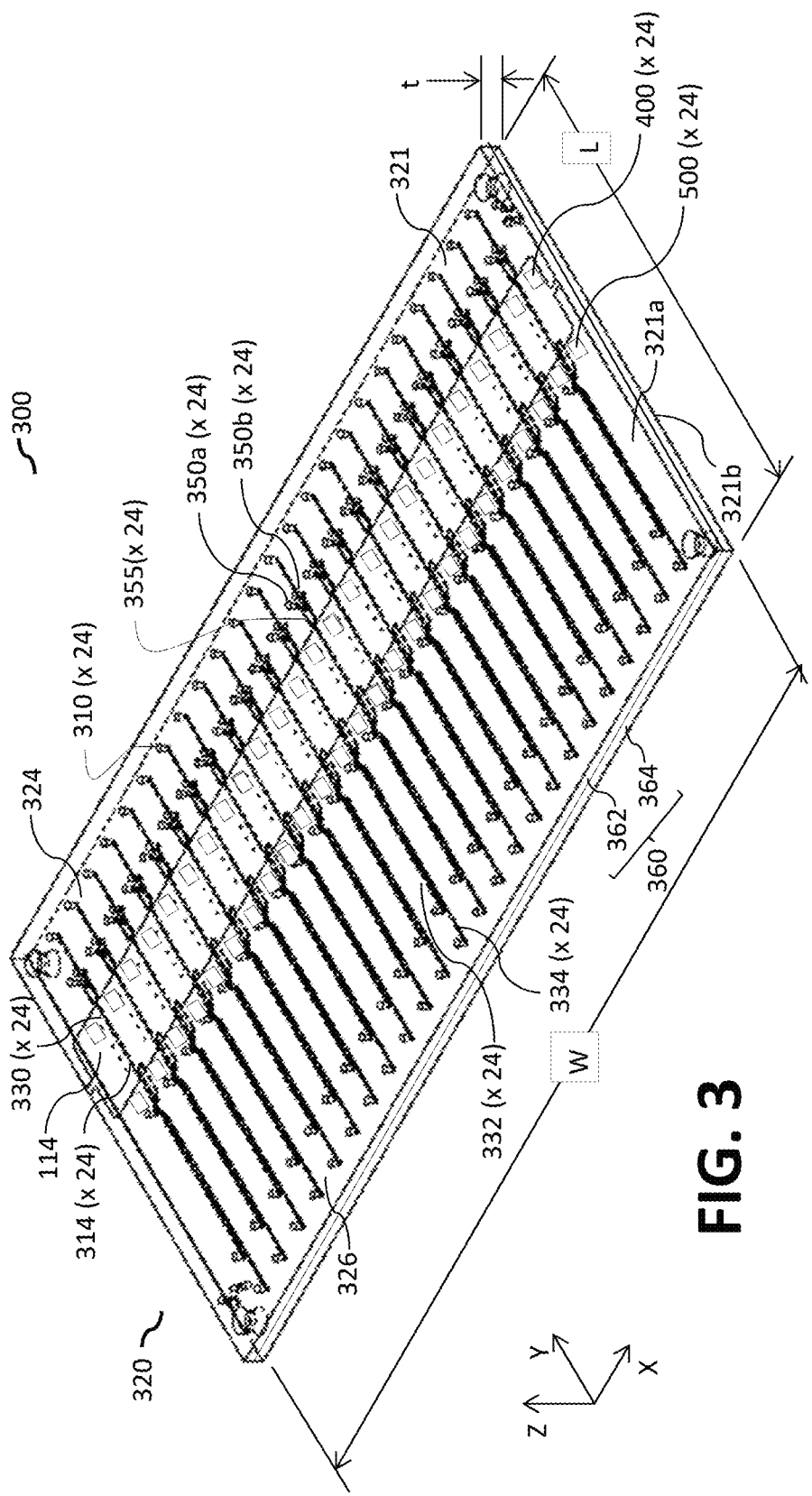
FIG. 3 illustrates, at least partially schematically, an exemplary microfluidic chip according to aspects of the present disclosure.

According to certain embodiments and still referring to FIG. 3, microfluidic assembly 300 may be configured as a microfluidic chip 320 and may include a substrate 321 having the plurality of channels 330 (e.g., micro channels) disposed or formed therein. The microfluidic flow channels 330 may be configured to transport fluid and/or particles through the microfluidic chip 320 for processing, handling, and/or performing any suitable operation on a liquid sample.

For example, each micro channel 330 may be associated with a flow cytometer. Optionally, each micro channel 330 may be a micro-sorter.

Particles in channels 330 may be detected while flowing through the interrogation region 114. Within the interrogation region 114, individual particles may be inspected or measured for a particular characteristic, such as size, form, orientation, fluorescence intensity, etc. Interrogation region 114 may be illuminated through an upper surface 321a and/or a lower surface 321b of the substrate 321 that forms the microfluidic chip 320.

The plurality of channels 330 may be evenly distributed (i.e., evenly spaced) across the width W of the microfluidic chip 320. According to certain embodiments, a centerline-to-centerline spacing between the channels 330 may range from 0.2 mm to 5.0 mm. The centerline-to-centerline spacing between the micro channels 330 may be less than 4.0 mm, less than 3.0 mm, or even less than 1.0 mm. According to certain embodiments, the centerline-to-centerline spacing between the micro channels 330 may range from 2.5 mm to 3.0 mm. Advantageously, to minimize the footprint of the microfluidic chip 320, the centerline-to-centerline spacing between the micro channels 330 may be less than 2.0 mm, less than 1.5 mm, or even less than 1.0 mm. According to certain embodiments, the centerline-to-centerline spacing between the micro channels 330 may range from 0.7 mm to 1.2 mm.

In the embodiment illustrated in FIG. 3, the microfluidic chip 320 includes twenty-four microfluidic flow channels 330, although, in general, any number of flow channels 330 may be provided (e.g., as non-limiting examples, 2, 4, 8, 24, 36, 72, 144, or 288 channels). According to some embodiments, when microfluidic chip 320 has twenty-four microfluidic flow channels 330, the microfluidic chip 320 may have an overall width W ranging from 70 mm to 80 mm.

The substrate 321 may be provided as a substantially planar substrate, i.e., having a first dimension (e.g., thickness t) much less than its other two dimensions (e.g., length L and width W). Further, the substrate 321 of the microfluidic chip 320 may include first and second major plane surfaces: the upper surface 321a and the lower surface 321b. The substrate 321 of the microfluidic chip 320 may be formed with one or more substrate layers 360. As shown in FIG. 3, the substrate 321 may be formed by bonding or otherwise attaching an upper substrate layer 362 to a lower substrate layer 364. In general, any number of layers may be used to form microfluidic chip 320 with any number of materials forming these layers in whole or in part. Materials may be chosen for their acoustic, optical or other electromagnetic radiation, heat, and electrical transmission characteristics, for their mechanical properties, and also for their manufacturing and formability characteristics.

The substrate layers 360 (e.g., layers 362, 364, etc.) of the microfluidic chip 320 may be glass (e.g., UV fused-silica, quartz, borofloat, etc.), PolyDiMethylSiloxane (PDMS), PMMA, COC, thermoplastic elastomers (TPE), including styrenic TPE, or any other suitable material. According to certain embodiments, a first substrate layer may be a cover layer formed of BF33. Heater elements 512, as described below, may be formed on the surface of the BF33 substrate. According to certain aspects, the heating element 512 may be constructed by photolithography or other techniques known by person of skill in the art. A second substrate layer may be formed of PDMS with microfluidic channels formed therein (e.g., molded, soft lithography, etc.). These two substrate layers forming the microfluidic chip 320 may be electronically, operationally engaged to a printed circuit board (PCB) layer. According to other embodiments, a first substrate layer may be a cover layer formed of BF33. Heater elements 512 and their associated circuitry may be formed on the surface of the BF33 substrate. A second substrate layer may be formed of silicon with microfluidic channels formed therein (e.g., deep reactive ion etched (DRIE), photolithography, etc.). The BF33 substrate layer may be anodically bonded to the silicon substrate layer. Other configurations, materials, and/or forming processes for the various substrate layers may be suitable as would be apparent to persons of ordinary skill in the art given the benefit of this disclosure.

The thickness of the first substrate layer 362 may range from approximately 100 µm up to approximately 1000 µm. In certain preferred embodiments, the thickness of substrate layer 362 may range from approximately 200 µm up to approximately 600 µm. For example, the thickness of substrate layer 362 may be approximately 400 µm. In other preferred embodiments, the thickness of substrate layer 362 may range from approximately 500 µm up to approximately 900 µm. By way of non-limiting examples, the thickness of substrate layer 362 may be approximately 700 µm or approximately 750 µm. In certain embodiments, the microfluidic chip 320 may be formed with only two substrate layers 362, 364. According to some embodiments, at least a portion of a substrate layer may be optically transmissive, particularly in the particle interrogation region 314 of the microfluidic channels 330. As one example, one or more micro-lenses or other on-chip optics may be provided on the substrate(s) of the microfluidic chip.

Still referring to FIG. 3, the microfluidic chip 320 may be configured to receive and process a sample fluid. Thus, the microfluidic chip 320 may include an input region 324 in which a sample containing particles (e.g., cells, etc.) is input into the microfluidic chip 320 for processing. The sample fluid may be input via a plurality of sample inlet ports 310 through the upper surface 321a of the microfluidic chip 320. Each microfluidic flow channel 330 may be in fluid communication with the one or more sample inlet ports 310 configured to receive a sample fluid. The sample inlet ports 310 may be in fluid communication with a sample reservoir, manifold, channel, well, test tube, etc. (not shown).

The microfluidic chip 320 may also include an output region 326 for removing the processed sample from the microfluidic chip 320. Output region 326 may include one or more ports associated with each of the microfluidic flow channels for receiving the processed sample from one or more branch channels or collection regions 332, 334. These channels 332, 334 may be in fluid communication with or may include keep and/or waste reservoirs, chambers, manifolds, wells, etc. (not shown). As known to person of ordinary skill in the art, any number of branch channels may be provided so that the sample may be processed into any number of collection regions.

The microfluidic flow channel 330 may be configured to hydrodynamically focus the sample fluid and align particles within the sample fluid by using focusing fluid (e.g., sheath fluid) and a core stream forming geometry. The core stream forming geometry may be used to maintain laminar flow and to focus, streamline, decelerate, and/or accelerate the flow of a core stream of the sample fluid with a surrounding sheath of focusing fluid within the microfluidic channel. Thus, according to certain aspects, the particle focusing system 132 (see FIG. 1) may include the use of focusing fluid (e.g., sheath fluid) and hydrodynamic flow features 355 provided as part of the flow channel 330. As non-limiting examples, some exemplary hydrodynamic focusing configurations and features are disclosed, for example, in US Patent Publication No. 2014/0318645, "Hydrodynamic Focusing Apparatus and Methods" (Ser. No. 14/213,800, filed Mar. 14, 2014), the contents of which is hereby incorporated by reference in its entirety. Thus, optionally, and as shown in FIG. 3, each microfluidic flow channel 330 may be in fluid communication with one or more focusing fluid inlet ports 350a, 350b configured to receive a focusing fluid. The focusing fluid inlet ports 350a, 350b may be in fluid communication with a sheath fluid reservoir, chamber, manifold, channel, bag, bottle, container, etc. (not shown). As known to persons of skill in the art, other focusing methods such as inertial focusing may be used in addition to or instead of hydrodynamic focusing techniques. Even further, as known to persons of skill in the art, sample fluid may be supplied in the absence of any sheath or buffer fluid, and the sorting operation may be run without sheath fluid, i.e., sheathless.

Additionally or alternatively to the above-noted focusing techniques, according to certain embodiments, each of the plurality of microfluidic flow channels 330 may include a focusing mechanism 400 for entraining particles flowing within the channels 330. Focusing mechanism 400 may be provided as part of the particle focusing system 132 (see FIG. 1). According to certain aspects, the focusing mechanism 400 may include a surface acoustic wave (SAW) actuator or generation device. In a preferred embodiment, the SAW focusing actuator may include an inter-digitated transducer (IDT). Other SAW generating actuators may be used. Focusing via focusing mechanism 400 may occur in the absence or the presence of a sheath fluid.

According to certain aspects, each of the plurality of microfluidic flow channels 330 may include a switch mechanism 500 for sorting, deflecting, diverting and/or directing particles flowing within the channels 330 into various selected channel portions or collection elements 332, 334. Switch mechanism 500 may be provided as part of the particle switching system 134 (see FIG. 1). In certain preferred embodiments, switch mechanism 500 may sort particles on an individual, particle-by-particle basis. According to certain aspects, the switch mechanism 500 may include one or more bubble jet actuators 510.

Referring now to FIG. 4, an exemplary fluidic system 120, wherein a cartridge 220 includes fluid contact surfaces used for the particle processing process, is schematically illustrated (double line). According to certain embodiments, fluid contact surfaces included in the cartridge 220 may be enclosed and sealed (or sealable) from an external environment. According to certain embodiments, cartridge 220 may enclose all of the fluid contact surfaces required for the particle processing operation, such that during a particle processing operation all of the fluid contact surfaces are isolated and fluidically sealed from the external environment and from the remainder of the particle processing system 100. In a preferred embodiment, a fully enclosed, sealed, cartridge 220 may be configured for removable engagement (represented by the arrow in FIG. 4) to the remainder of the particle processing system 100.

Thus, according to certain embodiments, cartridge 220 may include one or more sample fluid chambers 122 and one or more sheath fluid chambers 121. These chambers 121, 122 may be loaded with a sample fluid and a sheath fluid via external ports 121a, 122a, respectively. Cartridge 220 may also include a one or more particle collection or keep chambers 126 and one or more waste fluid chambers 127. Fluid from these chambers 126, 127 may be extracted via external ports 126a, 127a, respectively. Some or all of ports 121a, 122a, 126a, 127a, may be sealed during the particle processing operation. According to certain embodiments, cartridge 220 may not include sheath fluid chambers 124. Even further, according to certain embodiments, cartridge 220 may include pre- and/or post-processing elements, components, chambers, and/or channels. These pre- and/or post-processing elements may include bulk selection components (bead pre-processing), assay chambers, mixing elements, reagent, lysing solution and/or washing solution storage chambers, mixing chambers, filters, temperature control elements, pressure control elements, incubation chambers, genetic material processing components, etc.

Cartridge 220 may further include a microfluidic channel assembly 124 (e.g., a microfluidic chip) operationally engaged to and in fluid communication with the fluid chambers of the cartridge 220 according to aspects of the present disclosure. As described above, the microfluidic channel assembly 124 may be provided as a microfluidic chip 320 and may include one or more microfluidic channels 330. (For ease of understanding, FIG. 4 shows only a single microfluidic channel 330.) Each microfluidic channel 330 may include a particle focusing region or site 331, a particle interrogation region or site 314, and a particle switching region or site 333. The microfluidic chip 320 (and also the cartridge 220) may be operatively engaged to the particle processing instrument 100 during a particle processing operation and then disengaged and removed from the particle processing instrument 100.

Cartridge 220 may be operatively engaged to the remainder of the particle processing system 100. For example, each particle focusing site 331 of the one or more microfluidic channels 330 may include a particle focusing mechanism 400 which may be operatively engaged with a focusing mechanism driver 431 that is provided on the remainder of the particle processing system 100 (i.e., the instrument). Each particle interrogation site 314 of the one or more microfluidic channels 330 may be operatively engaged with a particle interrogation system 110 that is provided on the instrument. Each particle switching site 333 of the one or more microfluidic channels 330 may include a switch mechanism 500 which may be operatively engaged with a switching mechanism driver 533 that is provided on the instrument. The focusing mechanism driver 431 and the switching mechanism driver 533 may include electrical signal generators that may provide AC signals and/or pulsed signals (both regular or varying) have any suitable waveform, frequency and/or amplitude.

As shown in FIG. 4, particle focusing site 331 is at least partially upstream of particle interrogation site 314 which is at least partially upstream of particle switching site 333. In an optional embodiment, one or more particle interrogation sites 314a may be provided downstream of the particle switching site 333. Particle interrogation sites 314a may be associated with either channel 332 (e.g., a waste channel), channel 334 (e.g., a keep channel), or both. These optional interrogation sites 314a may be used monitor the sort performance, to confirm the adequacy of the focusing, detection and/or switching optimization algorithms and/or to provide feedback to the sorting algorithm. In FIG. 4, an optional particle interrogation site 314a (dashed lines) is shown associated with channel 334. Although not shown so as to not crowd the figure, particle interrogation site 314a may be operatively engaged with particle interrogation system 110 (or with a secondary particle interrogation system) and further may be operatively engaged with the control system 150 (see FIG. 1).

According to some aspects, the focusing mechanism 400 may include a surface acoustic wave (SAW) actuator 410 or generation device. Surface acoustic wave generator 410 may include one or more IDTs 412. According to some embodiments, a single IDT 412 may be provided and the geometry and/or the surface of the microfluidic channel 330 at the focusing site 331 may be configured to reflect the acoustic wave in the channel 330 so as to create a standing interference pattern or a standing surface acoustic wave (SSAW). Alternatively, a pair of IDTs 412a, 412b may be provided, one on either side of the microfluidic channel 330 at the focusing site 331. Each of the IDTs 412a, 412b may generate opposing surface acoustic waves that merge to create a standing interference pattern within the fluid of the microfluidic channel 330. For example, each of the IDTs 412a, 412b may generate equal and opposite surface acoustic waves. Focusing may rely on acoustic radiation forces exerted on the particles within the microfluidic channel 330 to move the particles from areas of higher pressure to lower pressure.

According to some aspects and still referring to FIG. 4, switch mechanism 500 may include one or more bubble jet actuators 510. Each bubble jet actuator 510 may include one or more heating elements 512 (see FIG. 5A). Bubble jet actuators 510 operate by generating one or more vapor bubbles due to superheating the fluid adjacent to the heating elements 512. The expansion of the vapor bubbles generates a pressure pulse and a slug of fluid is ejected from the bubble jet actuator into the microfluidic channel 330.

According to some embodiments, a single bubble jet actuator 510 may be provided, adjacent to the microfluidic channel 330 at the switching site 333. Alternatively, a pair of bubble jet actuators 510 may be provided, one on either side of the microfluidic channel 330 at the switching site 333. Each of the bubble jet actuators 510 may be configured to independently generate a transient pressure pulse in the fluid. Thus, a first bubble jet actuator 510 may drive a droplet or slug of fluid into a first selected region of the microfluidic channel 330 and a second bubble jet actuator 510 may drive a droplet of fluid into a second selected region of the microfluidic channel 330.

Figure 5B:
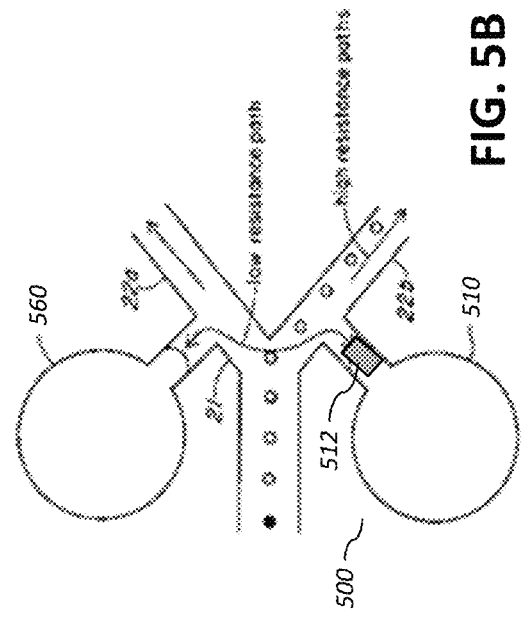
FIG. 5B illustrates a switch mechanism showing alternate positions for the bubble jet actuator and the pressure pulse dampening element.
Figure 5A:
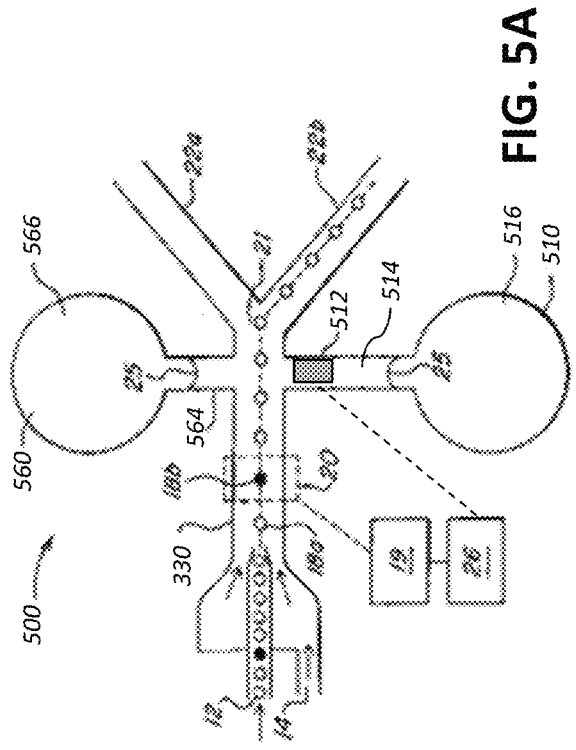
FIG. 5A is a schematic view of a switch mechanism particle sorting system according to an illustrative embodiment of the disclosure.
Figure 5C:
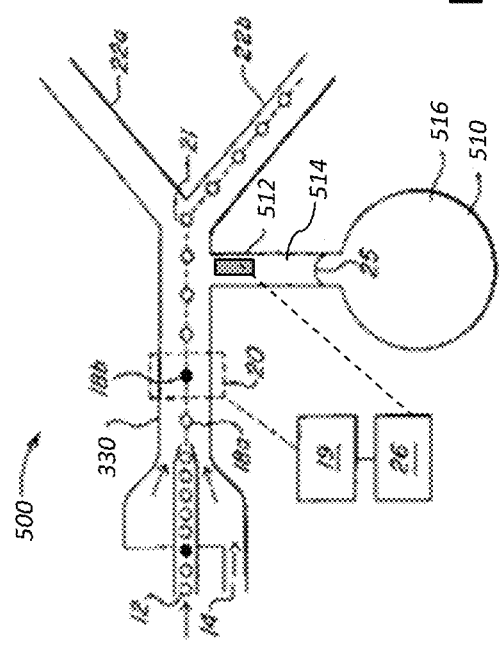
FIG. 5C illustrates a switch mechanism showing an alternate embodiment without the pressure pulse dampening element.

FIG. 5A schematically illustrates a portion an exemplary microfluidic chip with an enlarged detail of a portion of a microfluidic flow channel in the vicinity of the particle switching site. Referring back to FIG. 3, the microfluidic chip may include a plurality of microfluidic channels 330 arranged in parallel to one another with a switch mechanism 500 associated with each of the microfluidic channels 330. The parallel array of microfluidic channels 330 and switch mechanisms 500, e.g., may be formed by patterning a series of adjacent channels and bubble jet actuators 510 and vapor bubble generators (e.g., heating elements 512) on one or more substrate layers. In general, any number of microfluidic channels 330 may be provided and they need not be arranged in parallel. Further, in FIG. 5A (and in other figures that follow), inlet ports and outlet ports of the microfluidic channels are not depicted in these simplified schematics. Persons of ordinary skill in the art would recognize that inlet and outlet ports may be formed on any surface (top, bottom, end, side) of the microfluidic chip so as to allow flow through the microfluidic channels.

According to certain aspects, FIG. 5A schematically shows a portion of a particle sorting system 100, particularly directed to the switch mechanism 500 associated with a microfluidic channel 330. The microfluidic channel 330 may include a first supply channel 12 for introducing a stream of particles 18 and a second supply channel 14 for supplying a carrier liquid (such as a sheath fluid). The first supply channel 12 introduces a stream of particles 18 into the flow of carrier liquid. The primary microfluidic channel 330 conveys the particles suspended in the carrier liquid past the switch mechanism 500 and then branches into a first branch 22a and a second branch 22b at a branch point 21. When the flow is undisturbed, the particles normally stream through the second of the two branches 22b. An interrogation or detection region 20 is defined in the primary microfluidic channel 330 and is associated with a detector 19 to sense a predetermined characteristic of particles in the interrogation region 20.

At the interrogation or detection region 20, individual particles are inspected, using a suitable sensor means 19, for a particular characteristic, such as size, form, fluorescent intensity, etc. In a suspension introduced by the first supply channel 12, two types of particles can be distinguished, normal particles 18a and particles of interest 18b. Upon sensing the predetermined characteristic in a particle 18b in the interrogation region 20, the detector 19 raises a signal. The external signal generator 26 activates the switch mechanism 500, when signaled by the detector 19 in response to sensing the predetermined characteristic, to send a pressure pulse into the primary microfluidic channel 330 from the switch mechanism 500. The pressure pulse deflects the particle 18b having the predetermined characteristic so that it flows down the first branch channel 22a rather than the second branch channel 22b. An external signal generator 26 is provided for actuating the switch mechanism 500.

According to certain aspects, switch mechanism 500 includes at least one a bubble jet actuator 510 positioned in fluid communication with the primary microfluidic channel 330. Bubble jet actuator 510 may include a side passage or channel 514 and a side chamber 516. Further, bubble jet actuator 510 includes at least one heating element 512. Each heating element 512 may include one or more individual vapor bubble generators 511 (see FIGS. 19 and 20). Actuating the bubble jet actuator 510 causes the individual vapor bubble generators 511 of the heating element 512 to heat the adjacent fluid to superheated temperatures such that a vapor bubble is generated. The generation and expansion of the vapor bubble causes a pressure increase within the side channel 514 of the actuator 510. This pressure increase results in a slug of fluid being ejected from the side channel 514 and into the primary microfluidic channel 330. This results in a momentary flow disturbance or a transient pressure pulse in the primary microfluidic channel 330 and the deflection of a particle out of the stream of particles flowing through the channel 330.

Figure 19B:
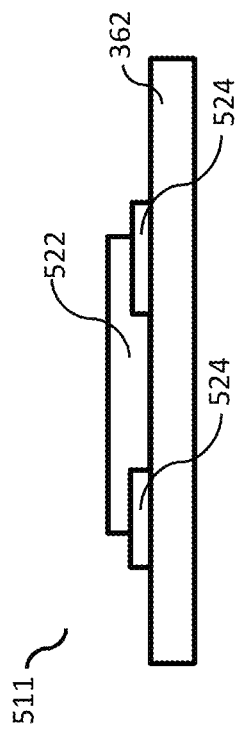
FIG. 19B is a cross-sectional view through line B-B of the embodiment of FIG. 19A.
Figure 19C:
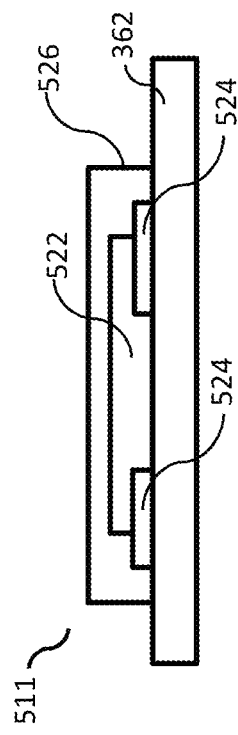
FIG. 19C is a cross-sectional view through line B-B of the embodiment of FIG. 19A with an electrically insulating layer.
Figure 19A:
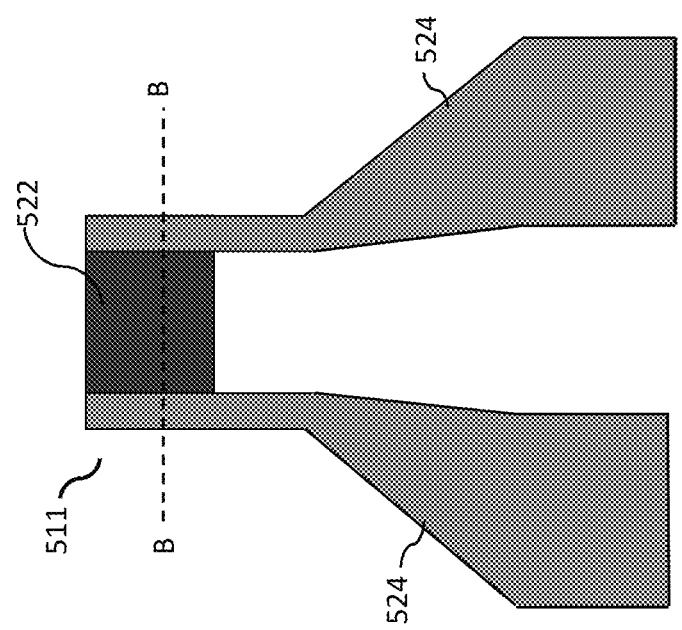
FIG. 19A is a schematic top view of an embodiment of a vapor bubble generator.

Referring to FIGS. 19 and 20, vapor bubble generators 511 are formed on a substrate layer (e.g., substrate layer 362) and include a heater layer 522 and electrical conducting layers 524. In FIGS. 19A-19C, the heater layer 522 extends at least partially over the electrical conducting layers 524. In FIGS. 20A-20C, the heater layer 522 extends at least partially under the electrical conducting layers 524. According to certain embodiments, the heater layer 522 may have an area ranging from approximately 100 µm² to approximately 3600 µm², from approximately 400 µm² to approximately 2500 µm², or even from approximately 1000 µm² to approximately 2000 µm². According to certain embodiments, the heater layer 522 may have planar dimensions ranging from approximately 20 µm to approximately 60 µm. According to other embodiments, the heater layer 522 for the individual bubble generators 511 may be much smaller, having an area that ranges from approximately 1 µm² to approximately 100 µm². Any dimensions suitable for generating the desired vapor bubble may be used. According to certain embodiments and as shown in FIGS. 19C and 20C, an electrically insulating layer 526 may be provided over the heater layer 522 and the electrical conducting layer 524. See, US Patent Publication No. 2014/0027005, "Enhances Flow Boiling in Microchannels by High Frequency Microbubble-Excited and -Modulated Oscillations," to Li (Ser. No. 13/828,701); "Bubble Jet Agent Release Cartridge for Chemical Single Cell Stimulation," Wrangler, N., et al., Biomed Microdevices (2013) 15:1-8; and Maxwell, R. B., et al., "a Microbubble-Powered Bioparticle Actuator," Journal of Microelectromechanical Systems, Vol. 12, No. 5, October 2003, each of which is incorporated by reference herein in its entirety, for example methods of fabricating and controlling a vapor bubble generator.

In general, any number of individual vapor bubble generators 511 in any arrangement may be provided per heating element 512 and any number of heating elements 512 in any arrangement may be provided per bubble jet actuator 510. Within any bubble jet actuator 510 having a plurality of heating elements and/or vapor bubble generators, the heating elements 512 and/or the vapor bubble generators 511 may be identical or may differ. A heater element 512 is the smallest unit individually controlled by the signal generator 26.

Referring back to FIG. 5A, in this particular embodiment, a pressure pulse dampening element 560 may be positioned in fluid communication with the primary microfluidic channel 330 and is located opposite to bubble jet actuator 510. Pressure pulse dampening element 560 also includes a side passage 564 and a side chamber 566. A compressible gas (for example, air) may be trapped within side chamber 566. The bubble jet actuator 510 and the pressure pulse dampening element 560 fluidically communicate with the primary microfluidic channel 330 through the opposed side passages 514, 564, respectively. Fluid from the primary microfluidic channel 330 flows into and fills these side passages 514, 564. In certain embodiments, fluid from the primary microfluidic channel 330 also at least partly fills the side chambers 516, 566. Thus, within the bubble jet actuator 510 and the pressure pulse dampening element 560 a meniscus 25 may define an interface between the fluid and a gas trapped in the side chambers 516, 566.

According to some aspects, the pressure pulse dampening element 560 serves as a buffer for absorbing or dampening undesirable pressure transients in the primary channel 330 created by the bubble jet actuator 510. Upon pressurizing the bubble jet actuator 510, an amount or volume of liquid is transiently discharged from the first side passage 514. The cooperation of the two opposed side passages and the fluidic structures they interconnect causes this volume of fluid flowing through the microfluidic channel 330 to be transiently moved sideways (i.e., perpendicular to the flow of particles) back and forth upon pressurizing (and then depressurizing) the bubble jet actuator 510. This transient liquid displacement, having a component perpendicular to the normal flow in the channel, may be applied to deflect particles having predetermined characteristics to separate them from the remaining particles in the stream. Essentially, the second side passage 564 cooperates with the first side passage 514 to accept and then to redirect the liquid displaced by the expansion of the vapor bubble within the bubble jet actuator 510. The pressure pulse dampening element 560 facilitates the displacement of the fluid slug in a direction perpendicular to the normal flow of the particles through the microfluidic channel 330. Further, the pressure pulse dampening element 560 mitigates or substantially eliminates any transient pressure pulses that would travel upstream and/or downstream from the bubble jet actuator 510.

According to certain embodiments, the side chamber 566 of the pressure pulse dampening element 560 is a buffer chamber having a resilient wall or containing a compressible fluid, such as a gas (e.g., air). During a switching event, the resilient properties of the side chamber 566 allow the flow of fluid from the primary microfluidic channel 330 to enter into the second side passage 564, allowing the pressure pulse to be absorbed and preventing disturbance to the flow of the non-selected particles in the stream of particles.

Figure 6A:
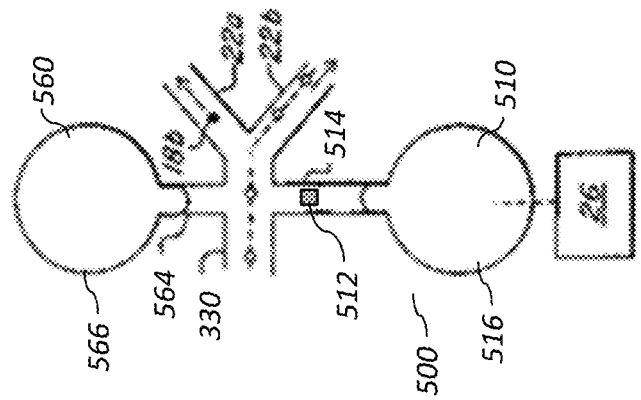
FIGS. 6A through 6C schematically illustrate the operation of the switch mechanism of FIG. 5A.
Figure 6B:
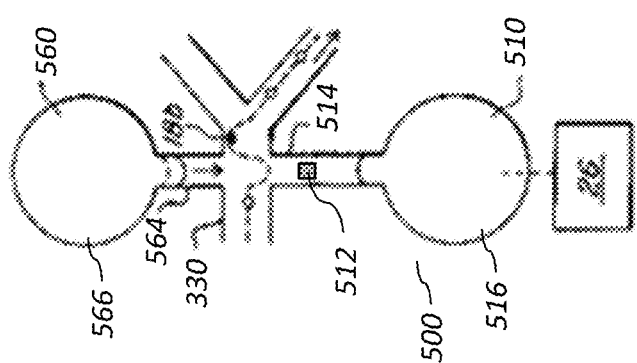
Figure 6C:
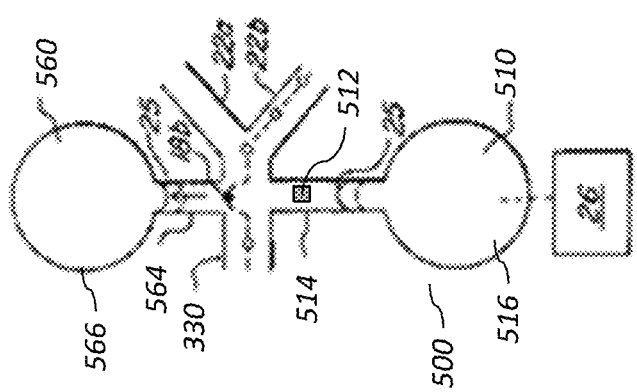

FIGS. 6A-6C illustrate the switching operation of switch mechanism 500 in the particle sorting system 100 of FIG. 5A. In FIG. 6A, the detector 19 senses the predetermined characteristic in a particle and raises a signal to activate the signal generator 26. Upon activation of the actuator, the pressure within the side chamber 516 of the bubble jet actuator 510 is increased, causing a transient discharge of liquid from the first side passage 514, as indicated by the arrow. The sudden pressure increase caused at this point in the primary microfluidic channel 330 causes fluid to flow into the second side passage 564, because of the resilient or damping properties of the pressure pulse dampening element 560. This movement of fluid into the second side passage 564 is indicated with an arrow. As a result, the flow through the primary microfluidic channel 330 is deflected, causing the selected particle of interest 18b located between the first side passage 514 and the second side passage 564 to be shifted perpendicular to its flow direction in the normal state. The flow resistances to the primary microfluidic channel 330, the first branch 22a and the second branch 22b may be chosen so that the preferred direction of the flow to and from the first side passage 514 and the second side passage 564 has an appreciable component perpendicular to the normal flow through the primary microfluidic channel 330. This goal may for instance be reached by the first branch 22a and the second branch 22b so that their resistances to flow is large in comparison with the flow resistances of the first side passage 514 and the second side passage 564.

FIG. 6B shows the particle sorting system 100 during the relief phase of the bubble jet actuator 510, i.e., when the growth of the vapor bubble is no longer generating a pressure pulse. During the relief phase, the particle of interest 18b has left the volume between the first side passage 514 and the second side passage 564. The signal generator 26 is deactivated, causing the pressure inside the bubble jet actuator 510 to return to the normal pressure. During this relief phase there is a negative pressure difference between the two side chambers 516, 566 of the opposed elements, causing fluid flow from the second side passage 564 to the first side passage 514, i.e., opposite to the fluid flow shown in the previous figure and as indicated by the arrows.

FIG. 6C illustrates the particle sorting system 100 after completion of the switching sequence. The pressures inside the elements 510, 560 are equalized, allowing the flow through the primary microfluidic channel 330 to normalize. As the particle of interest 18b has been displaced laterally, it will flow into the first branch 22a, while the other particles continue to flow into the second branch 22b, thereby separating the particles based on the predetermined characteristic.

This process of detecting and selective deflecting of particles may be repeated many times per second for sorting particles at a high rate. Adopting the fluid switching as described, switching operations may be executed up to around several thousand switching operations per second, yielding sorting rates in the order of million sorted particles per hour.

According to another embodiment of the disclosure, the bubble jet actuator 510 and the pressure pulse dampening element 560 may be placed in different positions. For example, as shown in FIG. 5B, the bubble jet actuator 510 and the first side passage 514 and/or the pressure pulse dampening element 560 and the second side passage 564 may be place downstream from the branch point 21. In general, the components may be placed in any suitable location, such that the flow resistance between the actuator side chamber 516 and the pulse dampener or buffer side chamber 566 is less than the flow resistance between any of these latter components and other pressure sources. More particularly, the actuator side chamber 516 and the buffer side chamber 566 may be placed such that the flow resistance between them is less than the flow resistance between a selected particle and a subsequent particle in the stream of particles. Positioning the components in this manner thus prevents a pressure wave generated by the above described method of deflecting a single selected particle from traveling upstream or downstream and affecting the flow of the remaining particles in the stream of particles.

The pressure pulse dampening element 560 is positioned to absorb the pressure wave created by the bubble jet actuator 510 and to prevent flow disturbance of the other particles of the particle stream. The spring constant of the pressure pulse dampening element 560 may be varied according to the particular requirements by varying the volume and/or the configuration of the buffer chamber 566, the cross-sectional area of the side passage 564 and/or the stiffness or the thickness of a flexible membrane, if any, forming the buffer chamber 566.

Thus, as described, a bubble jet actuator 510 may be used to momentarily cause a flow disturbance or pressure pulse in a microfluidic channel 330 to deflect a particle flowing within the channel out of its flow path and into a downstream branch channel. Bubble jet actuator 510 may include one or more heating elements 512. Heating elements 512 may take any suitable configuration (including, for example, an electrical heating element such as a Peltier junction element or a resistive heating element, an optical source heating element such as an optical absorbing layer, a microwave source heating element, induction heating, etc.). Each heating element 512 is associated with a signal generator that controls the generation of the vapor bubble. Heating element 512 is configured to generate a pressure pulse across the flow in the switching region of the flow channel. The pressure pulse travels in a generally transverse direction to the direction of flow. Optionally, the bubble jet actuator 510, rather than including a heating element, may include one or more cavitation focusing region wherein pulsed laser beams may be focused in the fluid to induce bubble cavitation. The signal generator 26 may control the pulsed laser beams. See, for example, Wu, T-H., et al., "Pulsed Laser Triggered High Speed Microfluidic Fluorescence Activated Cell Sorter," Lab Chip 2012 Apr. 7: 12(7): 1378-1383.

According to certain embodiments, the bubble jet actuator 510 may include a heating element 512 which may be located within a side passage or channel 514 in fluid communication with the primary microfluidic channel 533. When a voltage pulse (if the heating element is an electrical heating element) or a laser pulse (if the heating element is an optical source heating element) is applied to the heating element 512, the pulse of current/laser energy entering the heating element 512 causes a rapid vaporization of the fluid in the bubble jet side passage 514 and the formation of a vapor bubble. A resultant pressure increase propels a slug or droplet of fluid from the side passage 514 into the primary microfluidic channel 330. When properly timed with the travel of a selected particle through the primary microfluidic channel 330, the slug of fluid from the bubble jet actuator 510 deflects the particle out of its flow path and into a branch channel. Subsequently, the vapor bubble collapses and the slug of fluid displaced from the bubble jet actuator 510 must now be replaced.

In prior art bubble jet devices, the bubble jet device is in fluid communication with steady supply of replenishment fluid. For example, bubble jet devices associated with inkjet printers are provided with a separate steady supply of ink, such that after an ink drop has been ejected and the vapor bubble has collapsed, the ink is replenished. Basically, the ink flows through the inkjet device (and across the bubble jet device), with a droplet expelled from the downstream end of the inkjet and the ink replenished from the upstream end. However, according to certain aspects it may be advantageous to not have the bubble jet actuator in fluid communication with a separate replenishing fluid reservoir. For example, when sorting operations are performed without sheath or buffer fluid, it may be desirable to eliminate the need for a sheath or buffer fluid reservoir entirely.

Thus, according to certain aspects of the present disclosure, the bubble jet actuator 510 is not a flow through device. For example, the bubble jet actuator 510 may have a single opening in fluid communication with the microfluidic channel 330. Further, the bubble jet actuator 510 may eject a slug of fluid via this single opening and then may replenish or replace the ejected slug of fluid via the same opening in a replenishment stage of the sorting event. Thus, according to certain embodiments, the bubble jet actuator 510 is only in fluid communication with the microfluidic channel 330 and is not in fluid communication with any other fluid supply reservoir. In other words, the bubble jet actuator 510 (and its side chamber 516) may be a "blind chamber," i.e., a closed-end chamber having only a single opening and having no source for fluid replenishment other than from the primary microfluidic channel 330. The bubble jet actuator 510 may also be an "operative non-through flow chamber," in that, during operation of the bubble jet actuator 510 (i.e., during sorting events) there is no flow of fluid through the bubble jet actuator 510. Further, bubble jet actuator 510 is a "self-replenishment chamber," in that the bubble jet actuator 510 is not in fluid communication with a separate fluid replenishment supply or reservoir and there is no through flow of replenishment fluid. In other words, the slug of fluid ejected during a sorting event is replaced via the same ejection opening from the flow in the microfluidic channel 330.

According to certain aspects, when the bubble jet actuator 510 is provided as a blind chamber, air (or other gas) may be trapped within the bubble jet actuator 510 when fluid is first introduced into the microfluidic channel 330. For example, when fluid first flows into and through the primary microfluidic channel 330, fluid flows into the bubble jet side passage 514 and then may flow into the bubble jet side chamber 516. Typically, fluid fills the side passage 514 and may, at least partially, fill the bubble jet side chamber 516. However, at least a portion of the air within the side chamber 516 will remain in the side chamber as a trapped air bubble. For proper operation of the bubble jet actuator 510, any trapped air (or other gas) within the bubble jet side chamber 516 may not extend over the heating element 512. The heating element 512 must be covered by the fluid in order for a vapor bubble to be generated.

When the bubble jet actuator 510 is formed with a trapped air bubble, the trapped air bubble will be compressed when the vapor bubble is formed. This may reduce the magnitude of the pressure pulse that travels into the microfluidic channel 330. The size of the heating element 512 or the number of heating elements 512 provided in the bubble jet actuator 510 may be increased in order to counter this dampening effect due to the trapped air bubble. Further, the size of the side passage 514, particularly its cross-sectional area, the placement of the heating element 512 within the side passage 514, and the amount of fluid within the bubble jet actuator 510 may also be used to control and shape the volume of fluid ejected from the bubble jet actuator 510 and to mitigate the effect of the trapped air bubble. The trapped air bubble may further serve to dampen undesirable pressure transients, either within the bubble jet actuator 510 and/or with the primary microfluidic channel 330.

According to certain embodiments, the pulse dampening element 560 may also be formed as a blind chamber. Thus, similar to the blind bubble jet chamber, when fluid first flows into the primary microfluidic channel, the fluid may fill the side passage 564 and may, at least partially, fill the side chamber 566. At least a portion of the air within the side chamber 566 may be trapped within the side chamber. This air trapped within the pulse dampening element 560 may serve to dampen or absorb the pressure pulses generated by the bubble jet actuator 510.

Thus, according to certain embodiments, the bubble jet actuator 510 may be configured to accommodate a trapped air bubble in such a manner that that the heating element 512 remains at all times covered by the fluid. FIGS. 7A-7G show various embodiments of bubble jet actuators 510, side channels 514 and side chambers 516 as may be provided on a microfluidic chip. In each of the bubble jet actuators 510 of FIGS. 7A-7G the heating element 512 is located in the fluid filled portion 515 of the side channel 514, a trapped air bubble 517 is located at the closed end of the bubble jet actuator 510, and a meniscus 25 is formed at the surface of the fluid where the fluid meets the trapped air pocket 517. In general, the meniscus 25 may be located anywhere within the channel 514 beyond the location of the heating element 512 or within the side chamber 516.

Figures 7A, 7B, 7C, 7D, 7E, 7F, 7G:
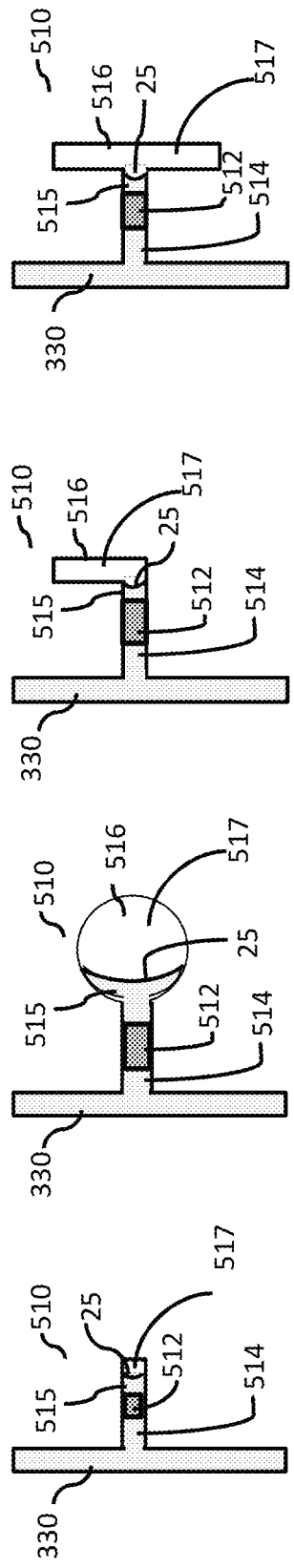
FIG. 7A-7G schematically illustrate various configurations of the bubble jet actuator with a trapped air bubble according to embodiments of the disclosure.

As shown in FIG. 7A, the bubble jet actuator 510 may be configured as a straight channel 514 having a substantially constant cross-sectional area. The trapped air pocket 517 is located at the closed end of the straight channel 514. As shown in FIG. 7B, the bubble jet actuator 510 may be configured as a straight channel 514 having a substantially constant cross-sectional area with a circular enlarged chamber 516 at its closed end. The trapped air pocket 517 is located in the circular chamber 516. The meniscus 25 may be located within the enlarged chamber 516, as shown, or within the channel 514. As shown in FIG. 7C, the bubble jet actuator 510 may be configured as an L-shaped channel 514/side chamber 516 having a substantially constant cross-sectional area. The trapped air pocket 517 is located at the closed end of the side chamber 516. As shown in FIG. 7D, the bubble jet actuator 510 may be configured as a T-shaped channel 514/side chamber 516 having a substantially constant cross-sectional area in each of the portions of the channel 514 and side chamber 516. Because the side chamber 516 is provided as two branched arms, the cross-sectional area of the side chamber 516 is twice that of the side channel 514. The trapped air pocket 517 may be located at the closed end of the channel 514 and may completely fill the arms of the side chamber 516. Optionally, the fluid filled portion 515 of the bubble jet actuator 510 may extend into the side chamber 516 such that two trapped air pockets 517 are formed at the closed ends of the arms. As shown in FIG. 7E, the bubble jet actuator 510 may be configured as a U-shaped channel 514/side chamber 516 having a substantially constant cross-sectional area. The trapped air pocket 517 is located at the closed end of the side chamber 516. As shown in FIG. 7F, the bubble jet actuator 510 may be configured as a U-shaped channel 514/side chamber wherein the channel 514 has a substantially constant cross-sectional area and the side chamber 516 has an enlarged closed end portion. The trapped air pocket 517 is located in the enlarged closed end of the side chamber 516. As shown in FIG. 7G, the bubble jet actuator 510 may be configured as a W-shaped channel 514/side chamber 516 having a substantially constant cross-sectional area in each of the portions of the channel 514 and side chamber 516. Because the side chamber 516 is provided as two branched arms, the cross-sectional area of the side chamber 516 is twice that of the side channel 514. The trapped air pocket 517 may be located at the closed end of the channel 514 and may completely fill the arms of the side chamber 516. Optionally, the two trapped air pockets 517 may be formed at the closed ends of each of the arms. These various bubble jet actuator configurations control the volume and position of the trapped air bubble.

In general, the side channel 514 need not have a constant cross-sectional area. For example, the side channel 514 may taper or narrow as it approaches the microfluidic channel 330, so that a more focused pulse may be delivered to a particle. As a non-limiting example, side channel 514 may have a width ranging from approximately 10 µm to approximately 100 µm and a height approximately equal to the height of the microfluidic channel 330.

FIG. 8 schematically illustrates that each of the bubble jet actuator configurations shown in FIGS. 7A-7G may be paired with a pulse dampening element 560.

In general, a microfluidic chip 320 provided with one or more bubble jet actuators 510 may be formed with any number of layers. According to one embodiment, the microfluidic chip 320 may be formed with only two substrate layers. A first layer may include the one or more heating elements 512 (and at least portions of the circuitry if the heating element is an electrical heating element) and may provide a cover to the second layer which may include the fluidic channels 330, 332, 334, 514, 516, etc. As a non-limiting example, the first layer may be BF33 and the second layer may be PDMS. According to another embodiment, the microfluidic chip 320 may be formed with only three layers. The first two layers may be as disclosed above, and the third layer may be a PCB. According to even another embodiment, the microfluidic channels 330, 332, 334, 514, 516, etc. may be formed by separately molding, etching or otherwise forming portions of microfluidic channels in one or more sublayers of PDMS and then bonding or otherwise joining these sublayers together to provide the microfluidic channels. For example, a first sublayer of PDMS may include the primary microfluidic channels 330, the side channels 514, and the pressure pulse dampening element 560 (or portions thereof), while a second sublayer may provide the side chambers 516 (or portions thereof). According to yet another embodiment, the microfluidic chip 320 may be formed with three substrate layers. A first layer may include one or more heating elements 512 (and at least portions of the circuitry if the heating element is an electrical heating element). A second layer (which may include a plurality of sublayers) provides the fluidic channels 330, 332, 334, 514, 516, etc. A third layer may include one or more heating elements 512. The second layer may be sandwiched between the first and third layer, such that the first and third layers form the top and bottom surfaces of the microfluidic channels. In this configuration, the bubble jet actuator 510 may be provided with both top and bottom heating elements 512 in the fluid filled portion 515 of the side channel 514. As a non-limiting example, the first and third layers may be BF33 and the second layer may be PDMS or silicon.

FIG. 9 schematically illustrates that each of the bubble jet actuator configurations shown in FIGS. 7A-7G may be paired with a second, opposed bubble jet actuator 510. In these configurations a first bubble jet actuator 510a switches particles into channel 334a and a second bubble jet actuator 510b switches particles into channel 334b. As only one of the bubble jet actuators will be activated for any given particle, each of the opposed bubble jet actuators 510a, 510b may also function as a pulse dampening element 560 for the activated bubble jet actuator.

Figure 10:
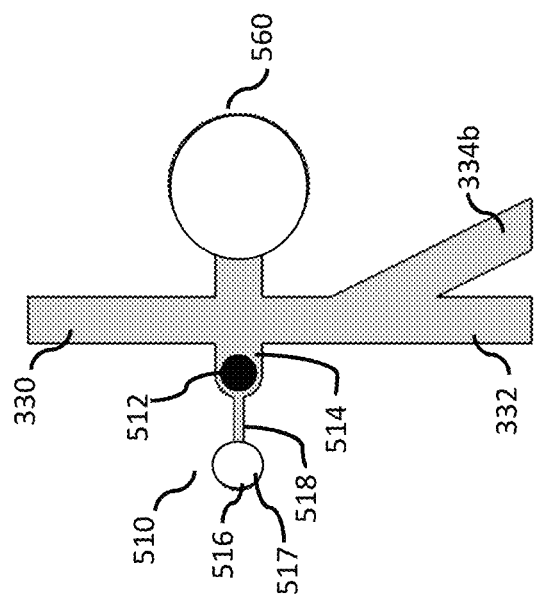
FIG. 10 is a schematic view of an embodiment of the switch mechanism with a constricted channel between the heating element and the trapped air bubble.

FIG. 10 schematically illustrates that each of the previously present bubble jet actuators 510 may be provided with a reduced cross-sectional portion 518 between the heating element 512 and the trapped air bubble 517. This constricted region 518 allows the trapped air to be captured in the side chamber 516 in a relatively isolated fashion. The constricted region 518 is provided with a significantly greater resistance to fluid travel than the resistance to fluid travel from side channel 514 into microfluidic channel 330. Thus, when a vapor bubble is generated at the heating element 512, the resulting pressure pulse will preferentially travel into the microfluidic channel 330. Such a constricted region 518 may be applied to any of the bubble jet actuators 510 disclosed herein. The constriction may be provided as a duct having a length and a restricted cross-section area (relative to the region in which the heating element 512 is provided) or it may be provided as an orifice having a restricted opening area. For example, side channel 514 may have a cross-sectional area ranging from approximately 100 µm² to approximately 10,000 µm². The constriction may be provided with a cross-sectional area that is less than 20 percent of the side channel's cross-sectional area, less than 10 percent of the side channel's cross-sectional area, less than 5 percent of the side channel's cross-sectional area, or even less than 1 percent of the side channel's cross-sectional area. According to other options, the constriction may be supplied as a fluid barrier (plug, membrane, etc.) that allows passage of gases.

Figure 11:
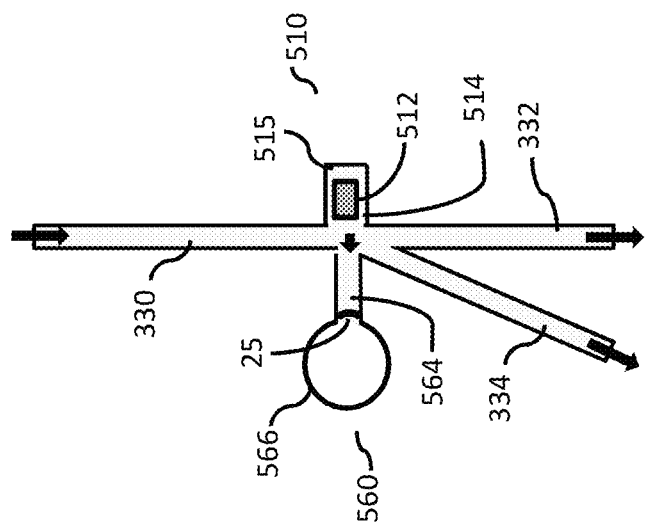
FIG. 11 is a schematic view of an embodiment of the switch mechanism, wherein the bubble jet actuator does not have a trapped air bubble.

According to other aspects, the bubble jet actuator 510 may be provided as a blind chamber, but may be configured such that air is not trapped in the closed end of the bubble jet actuator upon filling of the microfluidic channel 330. For example, FIG. 11 schematically illustrates that the side channel 514 may be completely filled with fluid, i.e., may be coincident with filled portion 515. Side channel 514 may be formed as a relative shallow channel that allows any fluid flowing through microfluidic channel 330 to flow into the side channel 514 while allowing air to flow out, without trapping the air. Optionally, hydrophobic and/or hydrophilic surfaces may be provided to preferentially channel the fluid to the closed end of the side channel 514 while preferentially allowing air to escape the dosed channel. For example, in hydrophobic capillaries it is possible to overcome capillary forces which prevent liquid from entering the capillary by increasing the pressure. Thus, the side channel 514 may be subjected to an initial pressure that forces the fluid into and the trapped air out of the end of the side channel.

Figure 12:
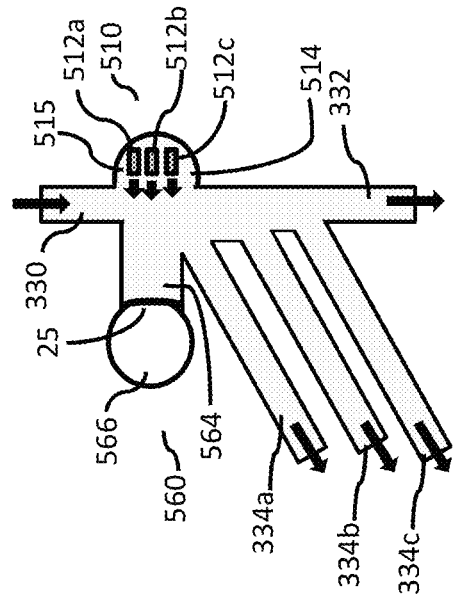
FIG. 12 is a schematic view of an embodiment of the switch mechanism with three heating elements.

FIG. 12 schematically illustrates that more than one heating element 512 may be provided in a bubble jet actuator 510. For example, heating elements 512a, 512b, 512c may be arranged sequentially along the flow axis of the microfluidic channel 330 within a single side channel 514. These heating elements 512a-512c may be individually controlled. Thus, the heating elements 5112a-512c may be sequentially triggered to apply a series of pressure pulses to a single particle. Optionally, the heating elements 512a-512c may be triggered at the same time to apply a single, wider pulse to a single particle. As another option, a selected heating element 512a-512c may be triggered to direct a select particle into a select channel. For example, triggering heating element 512a may direct a particle into channel 334a; triggering heating element 512b may direct a particle into channel 334b; triggering heating element 5122 may direct a particle into channel 334c. Other combinations of heating elements 512a-512c may be triggered. For example, a large, swiftly moving particle may require that both heating elements 512a and 512b be triggered to direct the particle into channel 334a. As would be apparent to persons of ordinary skill in the art, any number of heating elements 512 in any arrangement may be provided. Further, any number of one or more sorting channels 334 may be provided—the number of heating elements 512 need not be the same as the number of sorting channels 334.

Figure 14:
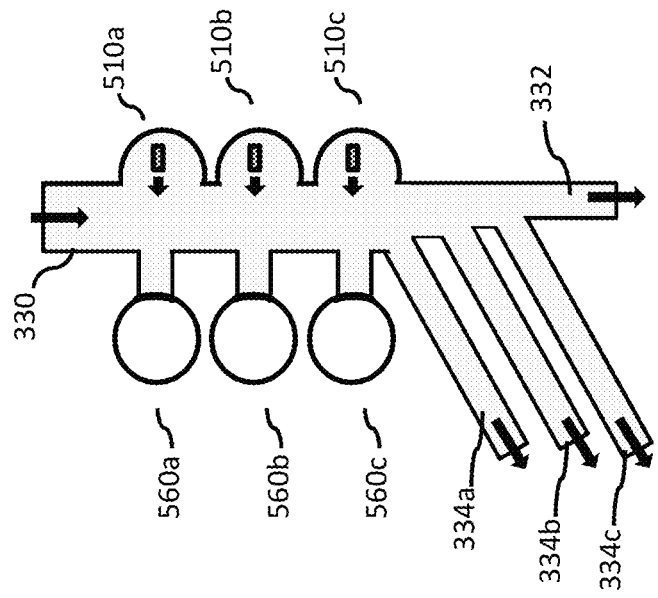
FIG. 14 is a schematic view of an alternative embodiment of the switch mechanism with three bubble jet actuators.
Figure 13:
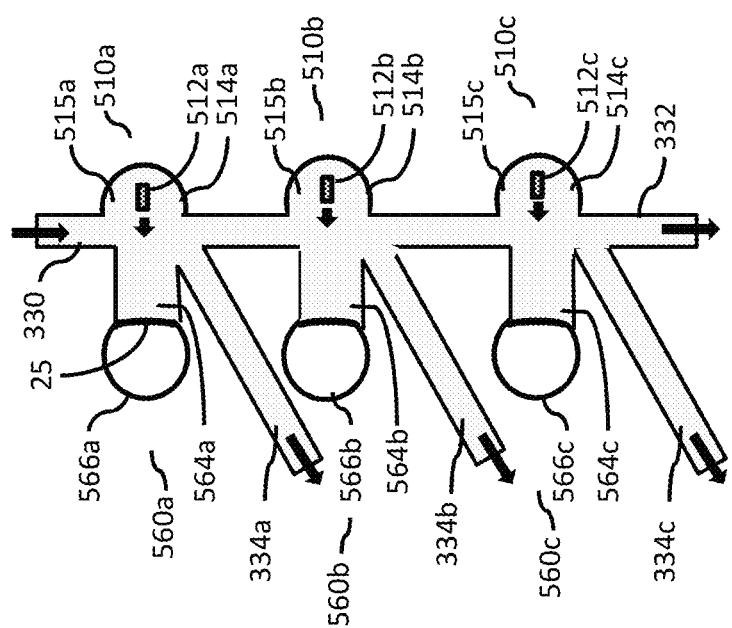
FIG. 13 is a schematic view of an embodiment of the switch mechanism with three bubble jet actuators.

FIGS. 13-14 schematically illustrate that any number of bubble jet actuators 510 may be associated with a microfluidic channel 330. As shown in FIG. 13, a plurality of bubble jet actuators 510a-510c may be sequentially positioned along the flow axis of microfluidic channel 330. Each bubble jet actuator 510 in this embodiment is associated with its own sorting channel 334. Thus, triggering heating element 512a, 512b 512c directs particles into channel 334a, 334b, 334c, respectively. FIG. 14 is somewhat analogous to FIG. 12, in that triggering one or more of the heating elements 512a, 512b, 512c may direct particles into any of the channels 334a, 334b, 334c. In FIG. 14, each bubble jet actuator 510a, 510b, 510c is provided with one or more heating elements 512 and is associated with a pressure pulse dampening element 560a, 560b, 560c, respectively.

Figure 16:
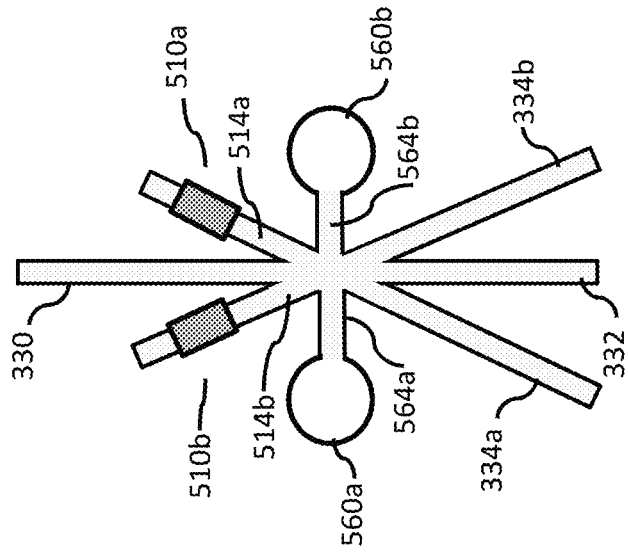
FIG. 16 is a schematic view of an alternative embodiment of the switch mechanism with opposed bubble jet actuators.
Figure 17:
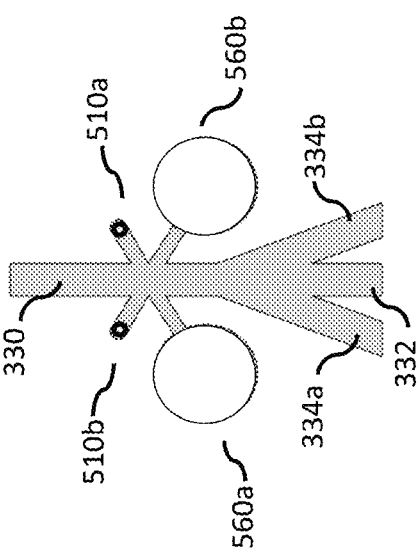
FIG. 17 is a schematic view of another embodiment of the switch mechanism with opposed bubble jet actuators.
Figure 15:
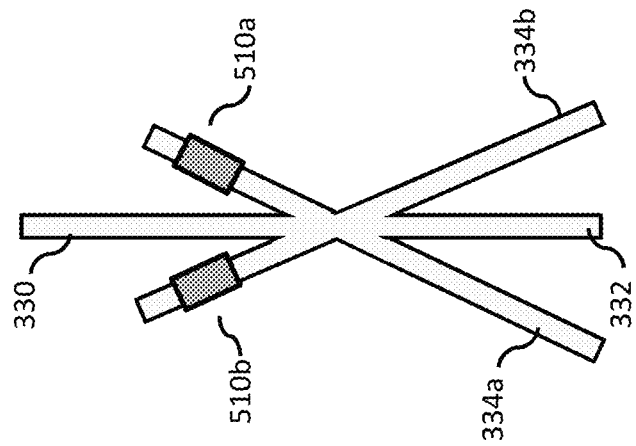
FIG. 15 is a schematic view of an embodiment of the switch mechanism with opposed bubble jet actuators.

FIGS. 15-17 schematically illustrate variations of the paired, opposed bubble jet actuator configuration of FIG. 9. In each of these configurations a first bubble jet actuator 510a switches particles into channel 334a and a second bubble jet actuator 510b switches particles into channel 334b. In FIG. 15, the bubble jet actuators are substantially axially aligned with the associated sorting channel, such that a pressure pulse generated by bubble jet actuator 510a, 510b is directed down the longitudinal flow axis of sort channel 334a, 334b, respectively. In FIG. 16, each of the bubble jet actuators are substantially aligned with the associated sorting channel, as in FIG. 15, and additionally a pressure pulse dampening element 560a, 560b is associated with each bubble jet actuator 510a, 510b, respectively. Each pressure pulse dampening element 560 is located on the opposite side of microfluidic channel 330 from its associated bubble jet actuator 510, however, the axes of the side channel 514 of the bubble jet actuator 510 and of the side channel 564 of the associated pulse dampening element 560 are not directly aligned with each other. In FIG. 17, each bubble jet actuator 510a, 510b is aligned with an associated pressure pulse dampening element 560a, 560b, but is not directly aligned with its associated sort channel 334a, 334b.

Figure 18:
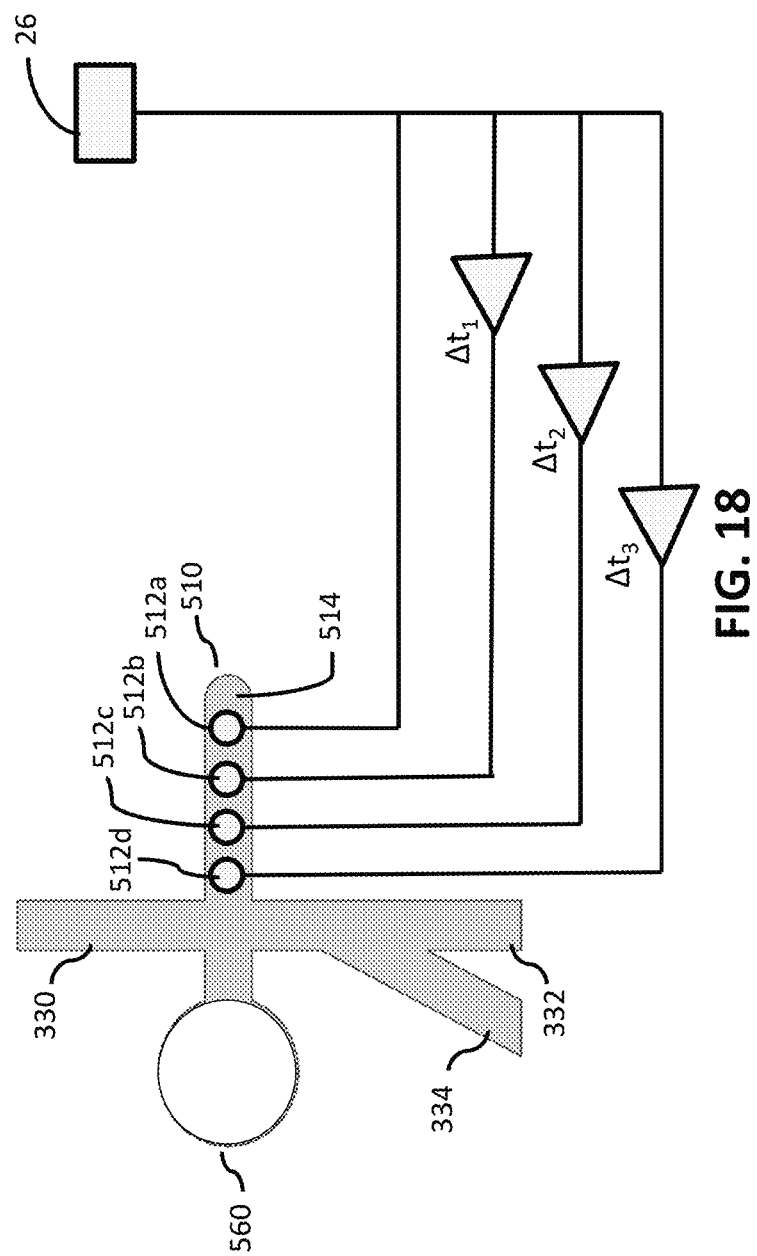
FIG. 18 is a schematic view of an embodiment of the switch mechanism with a bubble jet actuator having a plurality of heating elements.

FIG. 18 schematically illustrates a bubble jet actuator 510 that is a variation of the bubble jet actuator of FIG. 11. In FIG. 18, the bubble jet actuator 510 is provided with a plurality of heating elements. In this embodiment, four heating elements 512a-512d are arranged axially within the side channel 514. The axial arrangement and the number of the heating elements 512, as shown in this embodiment, is not meant to be limiting and, in general, there may be any number of heating elements 512 that may be arranged in any suitable configuration (a grid, circle, staggered, grouped, etc.).

Each of the heating elements 512a-512d may be separately controlled by signal generator 26. For example, each heating element 512 may be triggered sequentially. The time to trigger may include a time delay ($\Delta t$), which may be constant or may be varied. This may create a vapor bubble (and accompanying pressure pulse) that has a longer lifetime than if only a single heating element 512 were to be triggered. Sequentially triggering the plurality of heating elements 512 may allow a desired volume (pressure pulse) time-varying profile to be created, e.g., a vapor bubble volume or pressure pulse that starts strong, ends strong, has a relatively long constant pressure, etc. Optionally, one or more of the heating elements 512 may be triggered simultaneously. This may create a vapor bubble (and accompanying pressure pulse) that has a relatively large magnitude. Further, the triggering signal need not be the same for each heating element. Thus, for example, a first heating element may be provided with a high voltage, short duration pulse and a second heating element may be provided with a lower voltage, longer duration pulse.

Figure 21:
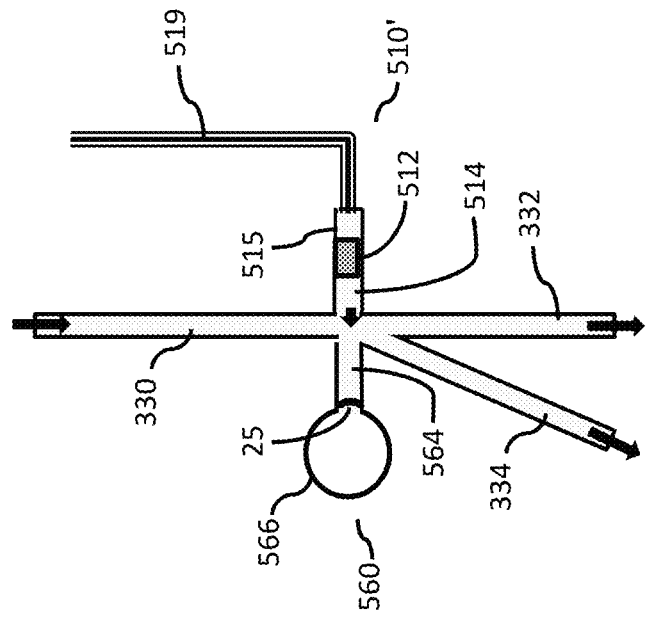
FIG. 21 is a schematic view of an embodiment of the switch mechanism with a air purge line.

In FIG. 21, a bubble jet actuator 510' is provided with an air purge line 519. When fluid first flows into and fills the microfluidic channel 330 and the bubble jet actuator 510', the air purge line 519 is open such that air may be vented from the end of bubble jet actuator 510'. Because air is allowed to flow out of the end of the bubble jet actuator 510' during an initializing operation, in this embodiment, the bubble jet actuator is not configured as a blind, closed-end chamber. However, during a sorting operation, the air purge line 519 is closed and there is no flow through the bubble jet actuator 510' (i.e., flow that enters through one opening and exits through another opening). Thus, the bubble jet actuator 510' is an operative non-through flow chamber, in that, during operation of the bubble jet actuator 510' (i.e., during sorting events) there is no flow of fluid through the bubble jet actuator 510'. Further, bubble jet actuator 510' is a self-replenishment chamber, in that the bubble jet actuator 510' is not in fluid communication with a separate fluid replenishment supply or reservoir and there is no through flow of replenishment fluid. This is because the slug of fluid ejected during a sorting event is replaced via the same ejection opening from the flow in the microfluidic channel 330. If multiple bubble jet actuators 510' are provided on a single microfluidic chip (because, for example, multiple microfluidic channels 330 are provided on a single microfluidic chip 320 (see FIG. 3) and/or multiple bubble jet actuators 510' are provided per microfluidic channel 330 (see e.g., FIGS. 9, 13, 14)), then the purge lines 519 from the individual bubble jet actuators 510' may be merged or aggregated. In a similar manner, the output from channels 332, 334 may be merged or aggregated (not shown).

As can be easily understood from the foregoing, the basic concepts of the present disclosure may be embodied in a variety of ways. As such, the particular embodiments or elements disclosed by the description or shown in the figures accompanying this application are not intended to be limiting, but rather illustrative of the numerous and varied embodiments generically encompassed by the present disclosure or equivalents encompassed with respect to any particular element thereof. In addition, the specific description of a single embodiment or element may not explicitly describe all embodiments or elements possible; many alternatives are implicitly disclosed by the description and figures.

Unless defined otherwise, all technical and scientific terms used herein have the same meaning as commonly understood by one of ordinary skill in the art to which this disclosure belongs. It is also to be understood that the terminology used herein is for the purpose of describing particular embodiments only, and is not intended to be limiting, since the scope of the present disclosure will be limited only by the appended claims. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Moreover, for the purposes of the present disclosure, the term "a" or "an" entity refers to one or more of that entity. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. It will be understood that the endpoints of each of the ranges are significant both in relation to the other endpoint, and independently of the other endpoint. When a value is expressed as an approximation by use of the antecedent "about," it will be understood that the particular value forms another embodiment.

We claim:

1. A microfluidic particle processing system comprising:
   a substrate;
   a flow channel formed in the substrate, the flow channel having:
      a focusing region for focusing a flow of particles within the flow channel,
      an interrogation region at least partially downstream of the focusing region, and
      a switching region at least partially downstream of the interrogation region; and
   a side channel formed in the substrate fluidically coupled with the flow channel, the side channel associated with the switching region, the side channel including a bubble jet actuator operatively coupled with a switching mechanism driver, the bubble jet actuator having a first heater element and a second heater element arranged within the side channel and separately controllable by the switching mechanism driver to generate a vapor bubble to induce a pressure pulse in the flow in the switching region of the flow channel,
   wherein the bubble jet actuator is one of a blind, closed-end chamber, an operative non-through flow chamber, or a self-replenishment chamber.

2. The microfluidic particle processing system according to claim 1, wherein the bubble jet actuator includes a third heater element, each of the heater elements is configured to be individually controlled by the switching mechanism driver.

3. The microfluidic particle processing system according to claim 1, wherein the first heater element and second heater element are individually controlled for pre-nucleation warmup.

4. The microfluidic particle processing system according to claim 1, wherein the first heater element and the second heater element are individually controlled for triggering vapor bubble nucleation.

5. The microfluidic particle processing system according to claim 1, further comprising more than one bubble jet actuator configured to generate pressure pulses in the flow in the switching region of the flow channel.

6. The microfluidic particle processing system according to claim 1, further comprising a second bubble jet actuator configured to generate a second pressure pulse in the flow in the switching region of the flow channel, wherein the second bubble jet actuator is opposed to the first bubble jet actuator.

7. The microfluidic particle processing system according to claim 1, wherein the bubble jet actuator includes a trapped air bubble.

8. The microfluidic particle processing system according to claim 7, wherein the bubble jet actuator includes a constricted region between the first and second heating heater elements and the trapped air bubble.

9. The microfluidic particle processing system according to claim 1, further comprising a pressure pulse dampening element, wherein the pressure pulse dampening element is opposed to the bubble jet actuator.

10. The microfluidic particle processing system according to claim 1, wherein the configuration of the first heater element differs from the configuration of the second heater element.

11. The microfluidic particle processing system according to claim 1, further comprising at least a second flow channel formed in the substrate and a second bubble jet actuator configured to generate a pressure pulse in the flow of the second flow channel.

12. The microfluidic particle processing system according to claim 1, wherein the flow channel and the bubble jet actuator are in fluid communication.

\* \* \* \* \*